United States Patent
Arimoto et al.

[11] Patent Number: 5,371,613
[45] Date of Patent: Dec. 6, 1994

[54] IMAGE READING APPARATUS

[75] Inventors: Shinobu Arimoto, Yokohama; Hisakazu Okubo, Ichikawa, both of Japan

[73] Assignee: Canon Kabushiki Kaisha, Tokyo, Japan

[21] Appl. No.: 838,968

[22] Filed: Feb. 21, 1992

[30] Foreign Application Priority Data

Feb. 22, 1991 [JP] Japan ................................ 3-28628
Feb. 22, 1991 [JP] Japan ................................ 3-28629

[51] Int. Cl.$^5$ ......................... G06K 9/00; H04N 1/40
[52] U.S. Cl. ................... 358/461; 358/282; 358/455; 358/464
[58] Field of Search .............. 358/461, 282, 455, 283, 358/163, 284, 464, 280, 475, 474; 383/50, 54, 52; 355/38

[56] References Cited

U.S. PATENT DOCUMENTS

| | | | |
|---|---|---|---|
| 4,807,045 | 2/1989 | Shimano | 358/282 |
| 4,888,492 | 12/1989 | Arimoto | 250/578 |
| 4,985,760 | 1/1991 | Maeshima et al. | 358/80 |
| 5,001,768 | 3/1991 | Mita et al. | 358/461 |
| 5,062,144 | 10/1991 | Murakami | 358/461 |
| 5,245,383 | 4/1993 | Matsushita et al. | 355/38 |
| 5,253,083 | 10/1993 | Hirota | 358/461 |

*Primary Examiner*—Paul Ip
*Attorney, Agent, or Firm*—Fitzpatrick, Cella, Harper & Scinto

[57] ABSTRACT

An image reader comprises a platen on which an original is to be placed, a read unit for reading an image of the original placed on the platen, a first standard member having even density, a second standard member having even density and provided at a position different from the first standard member, a correction unit for correcting unevenness of a video signal resulted from reading the image of the original by the read unit on the basis of a first standard signal resulted from reading the first standard member by the read unit, and a compensation unit for compensating correction operation made by the correction unit on the basis of a second standard signal resulted from reading the second standard member by the read unit. The reader may also comprise an authorization unit for authorizing the compensation operation by the compensation unit. With the reader, unevenness of the video signal is always automatically corrected with satisfactory results.

15 Claims, 23 Drawing Sheets

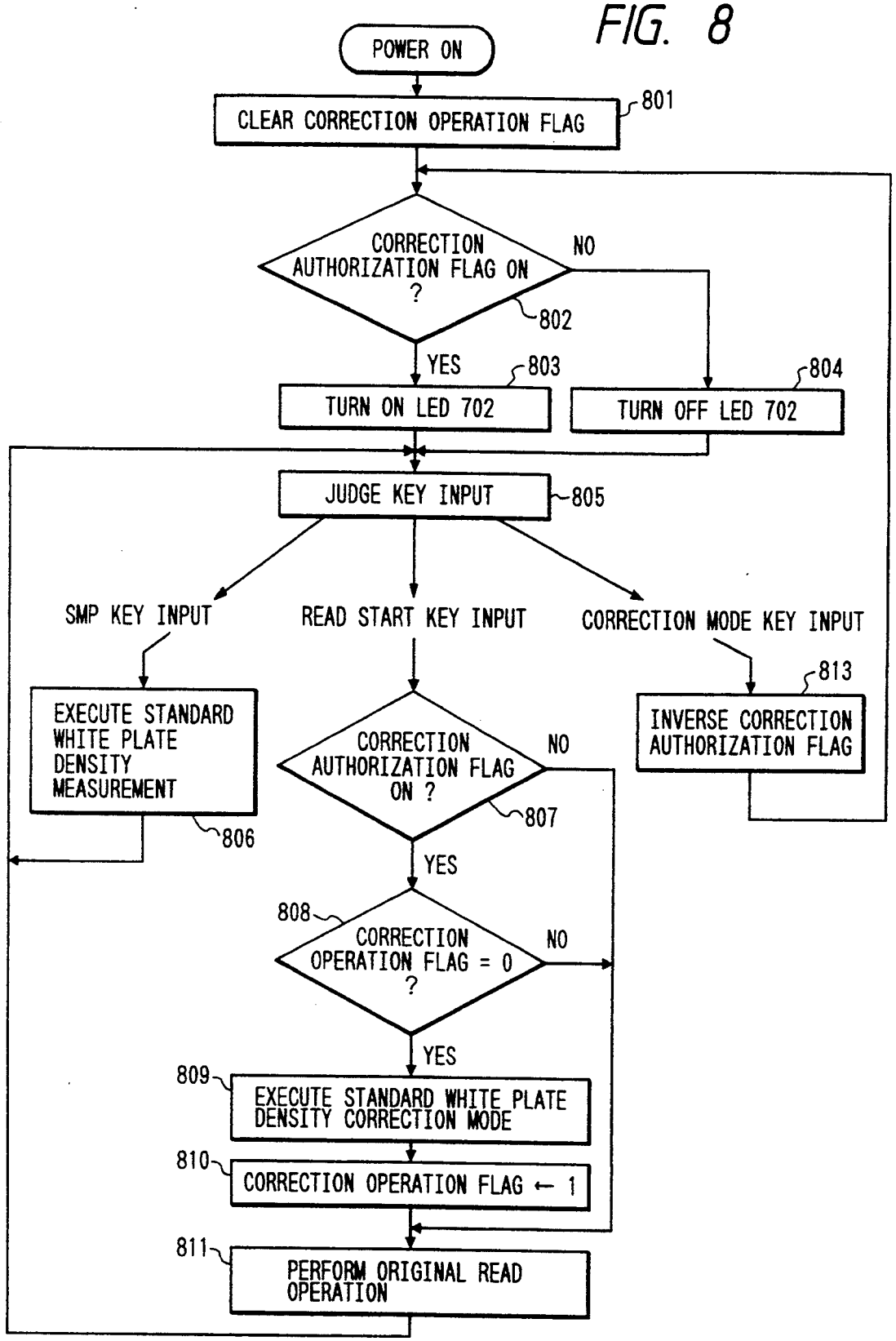

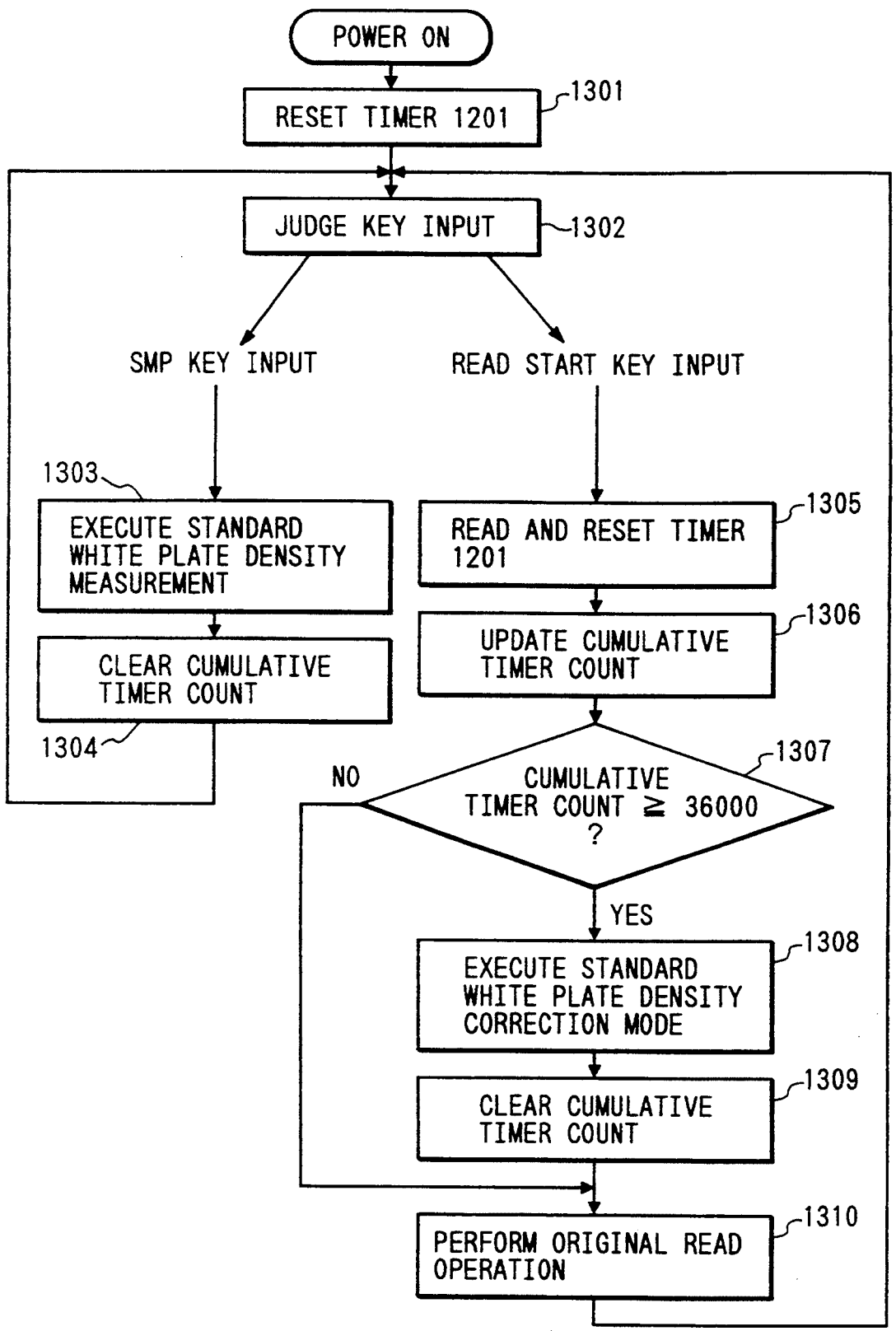

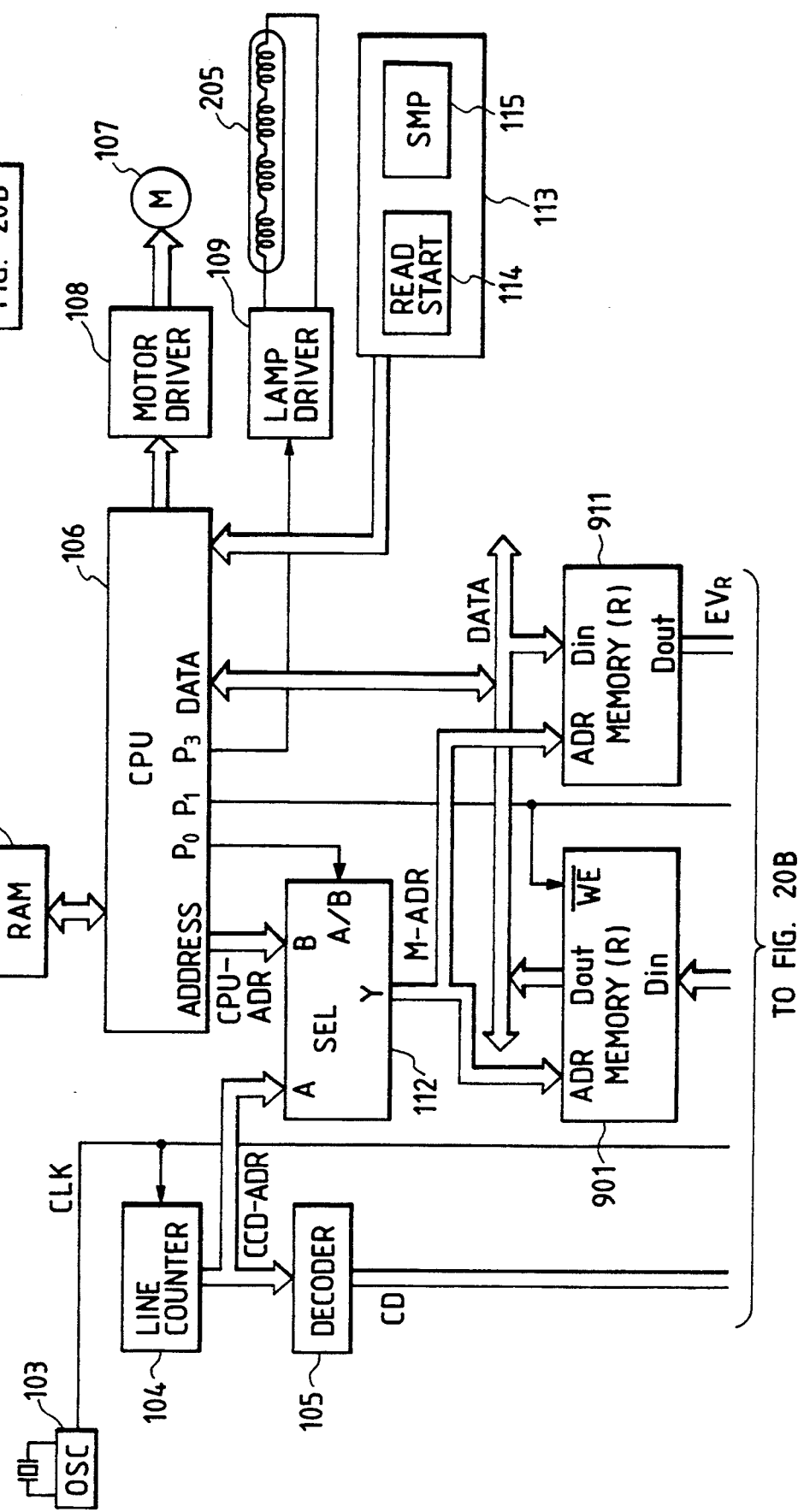

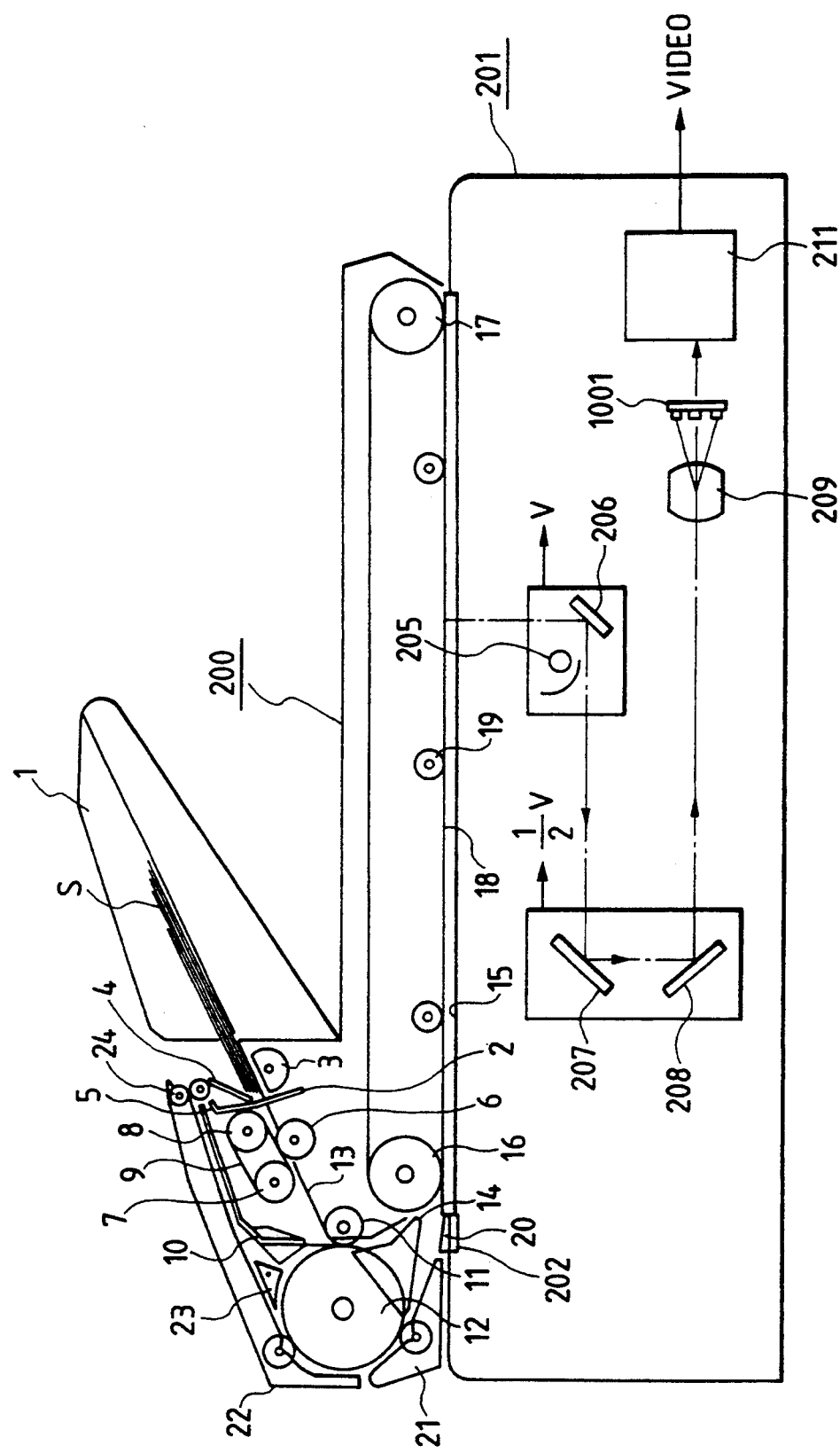

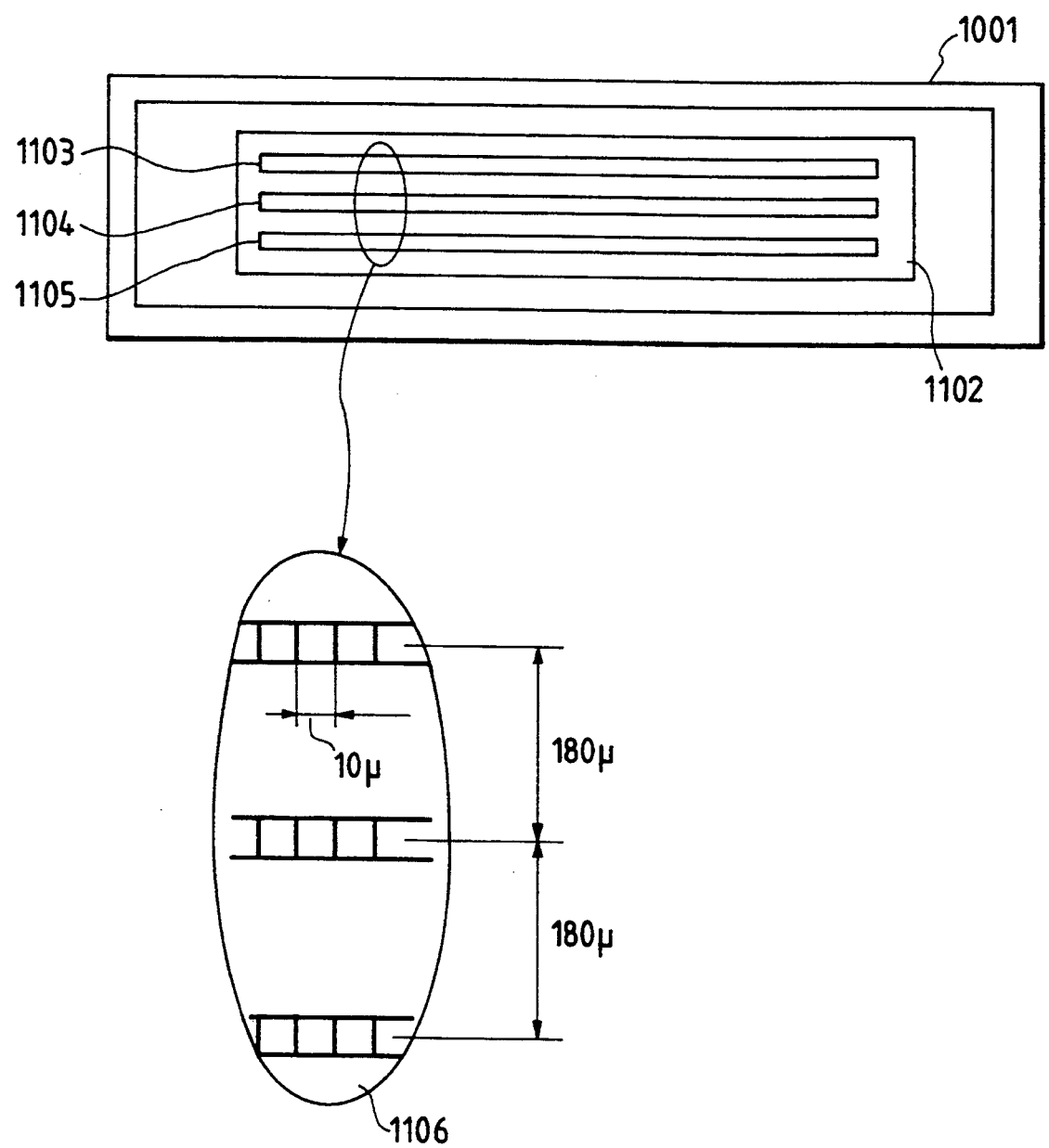

IMAGE READING APPARATUS

BACKGROUND OF THE INVENTION

1. Field of the Invention

The present invention relates to an image reader or an image reading apparatus for photoelectrically reading an original image.

2. Related Background Art

To photoelectrically read an original image in digital copying machines and facsimile machines, there have been employed image readers provided with photoelectric transducers such as CCDs. This type image reader includes a processing function, called shading correction, for evenly reading image density.

Heretofore, the shading correction is carried out by placing a standard white plate with known density outside an original read area, reading the standard white plate prior to reading an original, and storing a read signal in a first memory. Based on the data thus stored, the shading correction is effected for the read data resulted from reading the original.

Generally, a reader is arranged to make main scan reading of the document by using a one-dimensional CCD, and mechanically moving a read line of the CCD in a direction perpendicular to the direction of main scan. The standard white plate is placed at a position from which reading in the direction sub scan is started.

In the shading correction, a multiplication coefficient for converting the light intensity data, stored in the first memory and obtained from the standard white plate for each pixel, into a light intensity value corresponding to a known intensity value of the standard white plate, followed by storing the light intensity data in a second memory.

Then, when reading the original, the multiplication coefficient corresponding to a pixel being read is read out of the second memory and multiplied by a read signal of the original to effect the shading correction.

In the above prior art, because an original is placed on a platen glass, the original read signal is a signal having passed through the platen glass. On the contrary, because a standard white plate is fabricated by being painted on a metal thin sheet, it is not always arranged at the same height as the original surface and positioned at a level corresponding to the underside of the platen glass in many cases. In particular, where an automatic original feeder is mounted over the original platen glass, the standard white plate cannot be disposed on the platen glass as, if so, it would impede feeding of originals. Accordingly, the standard white plate is provided on the side of the platen glass opposite to the original surface, i.e., inside the reader.

While an original is covered by the platen glass, the reading surface of the standard white plate, prepared by painting, is directly bared to a light source and a CCD sensor. During use over a long term, therefore, the standard white plate directly exposed to an illumination is remarkably discolored in comparison with the document surface, thus resulting in a large deviation from the known density value initially set.

The standard white plate is also stained with deposition of dust and oil vapor inside the reader.

Since the shading correction is based on an assumption that the standard white plate has known density, the original read signal after the shading correction is inevitably deviated from a predetermined value due to changes in density of the standard white plate make. As a result, the original read signal may be varied to make density lighter or deeper, or in a color reader, color decomposition signals of R, G, B are ill balanced so that color tones and gray balance are no longer ensured.

As a known technique to compensate density changes of the standard white plate, there is proposed U.S. Pat. No. 4,888,492. With this technique, a totally white original is placed as a reference on the platen glass and density changes of the standard white plate are compensated on the basis of read data from the totally white original.

However, because such compensation is usually carried out by a serviceman who manually put a sheet of totally white paper on the platen glass, the above known technique has suffered from the disadvantage that the operation is troublesome and read quality may deteriorate if density of the standard white plate is changed before routine visit of the serviceman or before implementing the operation.

SUMMARY OF THE INVENTION

An object of the present invention is to provide an image reader free from the above-mentioned disadvantage in the prior art.

According to one form of the present invention, there is provided an image reader which can automatically compensate density changes of a standard white plate.

According to another form of the present invention, there is provided an image reader comprising a platen on which an original is to be placed, read means for reading an image of the original placed on said platen, a first standard member having even density, a second standard member having even density and provided at a position different from said first standard member, correction means for correcting unevenness of a video signal resulted from reading the image of said original by said read means on the basis of a first standard signal resulted from reading said first standard member by said read means, and compensation means for compensating correction operation made by said correction means on the basis of a second standard signal resulted from reading said second standard member by said read means.

According to still another form of the present invention, there is provided an image reader comprising a platen on which an original is to be placed, read means for reading an image of the original placed on said platen, a first standard member having even density, a second standard member having even density and provided at a position different from said first standard member, correction means for correcting unevenness of a video signal resulted from reading the image of said original by said read means on the basis of a first standard signal resulted from reading said first standard member by said read means, compensation means for compensating correction operation made by said correction means on the basis of a second standard signal resulted from reading said second standard member by said read means, and authorization means for authorizing the compensation operation by said compensation means.

Other objects of the present invention will be apparent from the attached drawings and the following detailed description.

BRIEF DESCRIPTION OF THE DRAWINGS

FIG. 8 is a control flowchart for a reader of one modified embodiment of the present invention;

FIG. 13 is a control flowchart for a reader of still another modified embodiment of the present invention;

FIGS. 20A and 20B are signal processing circuit diagrams of another modified embodiment of the present invention;

FIG. 21 is a view showing an arrangement of a reader of another modified embodiment of the present invention;

FIG. 22 is a view showing an arrangement of a color CCD for use in another modified embodiment of the present invention;

DETAILED DESCRIPTION OF THE PREFERRED EMBODIMENTS

Figure 2:
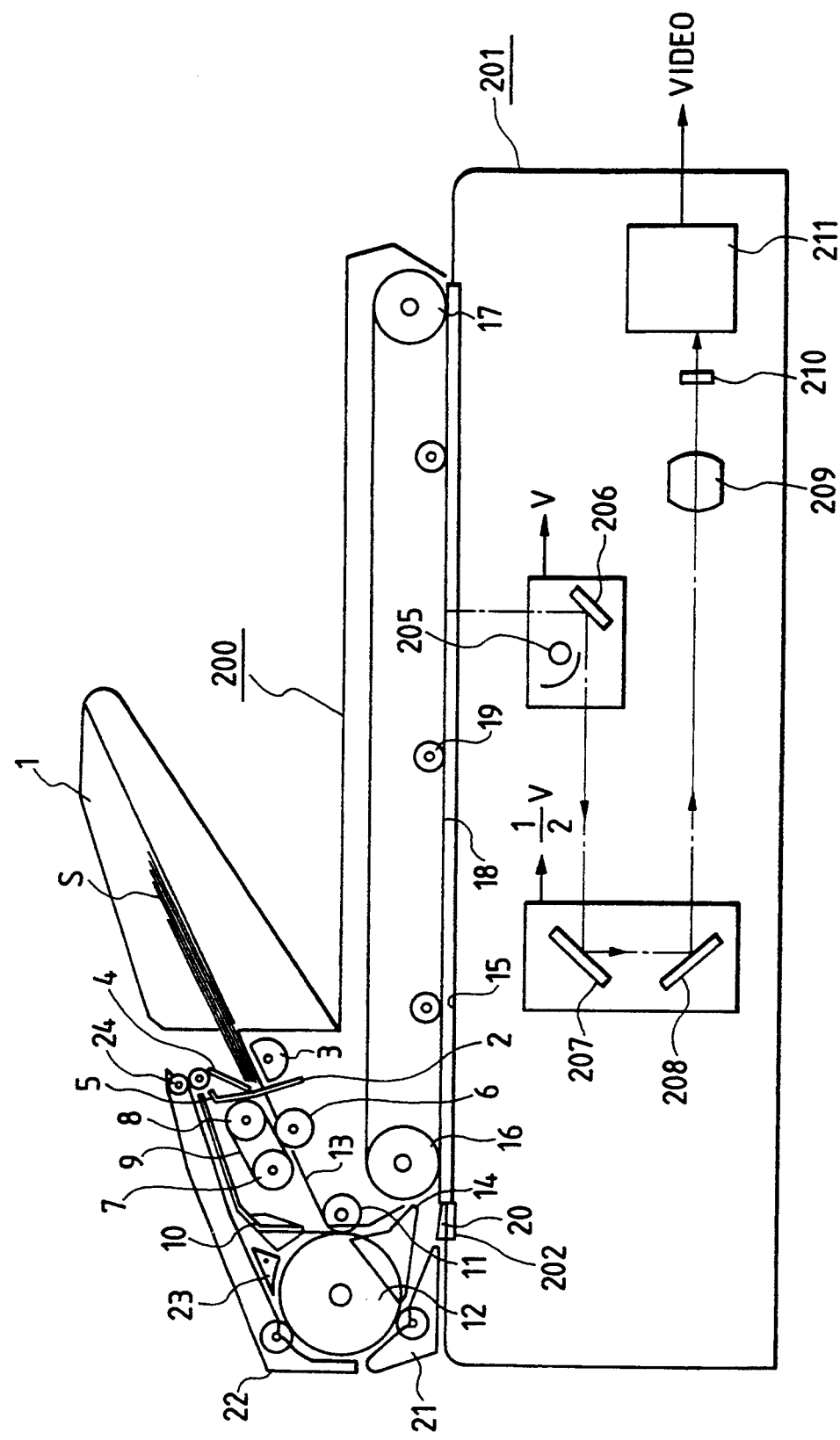
FIG. 2 is a view showing an arrangement of a reader of one embodiment of the present invention.

FIG. 2 shows an image reader embodying the present invention according to a first aspect.

Denoted at 200 is a circulation type original feeder for supplying plural sheets of originals to an image scanner unit 201 one by one. The image scanner unit 201 reads the orignal thus fed and carries out the digital signal processing.

In the original feeder 200, denoted at 1 is an original tray on which plural sheets of originals s are put by an operator. 2 is an original stopper against which the leading ends of the originals are abutted. 3 is a semilunar roller serving to loosen the leading ends of the originals and feed the lowermost sheet of the originals. 4 is a weight which, when the original is hard to enter a separation section, drops to press the semilunar roller 3 from above for aiding the feed of the original. 5 is a separation restricting plate to prevent the bundle of originals from protruding forwardly. 6 is a feed roller cooperating with a pair of separation rollers 7, 8 and a separation belt 9 to separate the lowermost sheet from the bundle of originals. The distal end of an upper guide 10 serves to guide the original so that its leading end may easily enter a regist nip defined between a regist roller 11 and a reversing roller 12. 13 is an inner guide plate and 14 is an intermediate guide, both of which define an original feed path for guiding the original onto a platen 15. A feed belt 18 stretched between a drive roller 16 and an end roller 17 and plurality of rolls 19 pressing the feed belt 18 from its back side cooperate to feed the original over the platen 15 and stop it in place. Read operation is carried out with the original kept in a stopped state. After the read operation, the feed belt 18 is rotated in the reversed direction so that the original is pushed up by a jump stand 20 and advances through a path defined between a lower guide 21 and the intermediate guide 14, following which it is accumulated again on the tray 1 by a discharge roller pair 24 after passing between an opening/closing guide 22 and the reversing roller 12, over a flapper 23 and over the upper guide 10.

Incidentally, when reading both sides of the original, the flapper 23 is so shifted in its position that the original passes under the flapper to be fed onto the platen again by the regist roller 11 and the reversing roller 12.

In the image scanner unit 201, denoted at 202 is a standard white plate. The standard white plate 202 is attached to the underside of the jump stand 20 and thus located below the upper surface of the platen 15 because the jump stand 20 is mounted below the upper surface of the platen 15. In other words, the jump stand 20 is disposed on the outer face of a reader housing, whereas the standard white plate 202 is disposed on the inner face of the reader housing and thus affected by dust, heat, oil vapor, etc. within the reader. The original 5 fed by the feeder 200 and fixed in place over the platen 15 is illuminated by a lamp 205. The reflected light from the document 5 is led to mirrors 206, 207, 208 in turn and focused on a line sensor (hereinafter referred to as a CCD) 210 by a lens 209. An output of the CCD 210 is sent as an original read electric signal to a signal processing unit 211.

The lamp 205 and the mirror 206 are moved at a speed V and the mirrors 207, 208 are moved at a speed ($\frac{1}{2}$)V mechanically in a direction normal to the electric scan direction of the line sensor, thereby scanning the entire surface of the original.

The read signal is subjected to shading correction in the signal processing unit 211 and outputted as a VIDEO signal therefrom.

Figure 1:
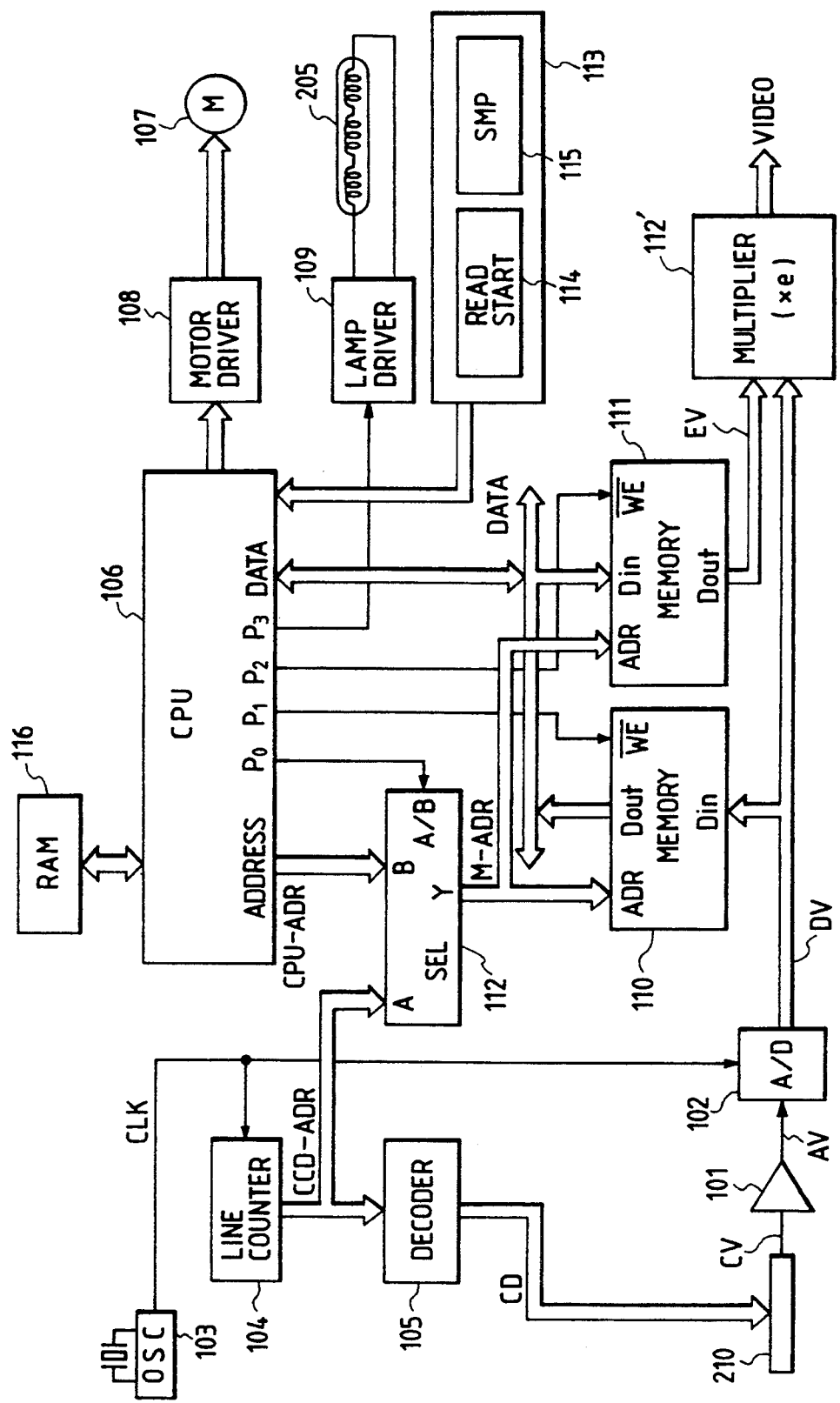
FIG. 1 is a signal processing circuit diagram of one embodiment of the present invention according to a first aspect.

FIG. 1 shows a circuit diagram of the signal processing unit 211.

The read signal CV from the CCD 210 is amplified by an amplifier 101 and, thereafter, converted into a digital video signal DV by an A/D converter 102. Denoted at 103 is an oscillator producing a pixel clock CLK for the CCD 210. 104 is a line counter producing a CCD address CCD-ADR to identify a read pixel in the CCD 210.

Because of this embodiment using a CCD comprised of about 5000 pixels, the line counter 104 repeats counting from 0 to 4999.

Denoted at 105 is an address decoder for decoding the CCD-ADR signal and outputting CD signals, such as a shift pulse, a reset pulse and a transfer clock, used to drive the CCD 210.

106 is a control-purposed CPU for controlling a motor 107 via a motor driver 108 to move the optical system (lamp 205 and mirrors 206, 207, 208) in the direction of sub scan. The CPU 106 also controls turning-on of the original illumination lamp 205 via a lamp driver 109. Further, the CPU 106 makes an access to external memories 110, 111 via an address bus CPU-ADR and a data bus. DATA. The CPU 106 includes therein a program memory (ROM) for those kinds of control.

112 is an address selector for selecting addresses of the memories 110, 111.

110 is a first memory for taking in data of one line from the CCD 210, and 111 i s a second memory for outputting a multiplication coefficient for each pixel.

112' is a multiplier for multiplying the digital video signal DV from the CCD 210 by a multiplication coefficient EV from the second memory 111, and outputting the video signal VIDEO having been subjected to the shading correction.

113 is a control panel including an original read start key 114 and a standard white plate density measurement key 115, along with a ten-key pad, indicators and so forth, as required.

Original Read Operation

Upon detecting the read start key 114 being depressed, the CPU 106 drives the original feeder 200 for feeding the original over the platen 15 and stopping it in place. Thereafter, the CPU 106 lights up the illumination lamp 205 and moves the first mirror 206 to the position of the standard white plate 202. The CPU 106 then sets $P_0$, $P_1$ signals to an L level and writes the read signals of one line from the standard white plate 202 at the addresses from 0 to 4999 of the memory 110. After setting the $P_1$ signal to an H level to complete the write operation, it sets the $P_0$ signal to an H level for reading the data out of the addresses from 0 to 4999 of the memory 110 one by one.

It is now assumed that the read data of the standard white plate taken out of the CCD's address X is Bx. In the shading correction, the read value Bx from the standard white plate is corrected into a light intensity conversion value Bd for the known standard white plate density. Therefore, the CCD read data corresponding to the address X is multiplied by Bd/Bx.

The multiplier 112' is a known digital multiplier which multiplies the video signal DV by 0 when an EV signal of 8 bits is EV=0, by 1 when EV=128, and by (1+127/128) when EV=255.

In other words, the multiplication coefficient e is given by e=EV/128. Accordingly, the CPU 106 sets a $P_2$ signal to an L level and writes EVx corresponding to e=Bd/Bx at the address X of the memory 111.

Thus, EVx=128 x e=128 x (Bd/Bx)

By repeating the above process from the address 0 to the address 4999, the CPU 106 writes the multiplication coefficients, corresponding to the respective pixels of the CCD 210, in the memory 111.

During the subsequent original read operation, the CPU 106 sets the $P_0$ signal to an L level again and the $P_2$ signal to an H level, followed by instructing the memory 111 to output the multiplication coefficients corresponding to the respective pixels of the CCD 210. Subsequently, the CPU 106 instructs the multiplier 112' to multiply the video signal DV outputted from the original read operation by the multiplication coefficient for each pixel, thereby to carry out the shading correction, and further advances the optical system at the predetermined seed V for reading the entire surface of the original.

Standard White Plate Density Measurement Mode

Figure 3:
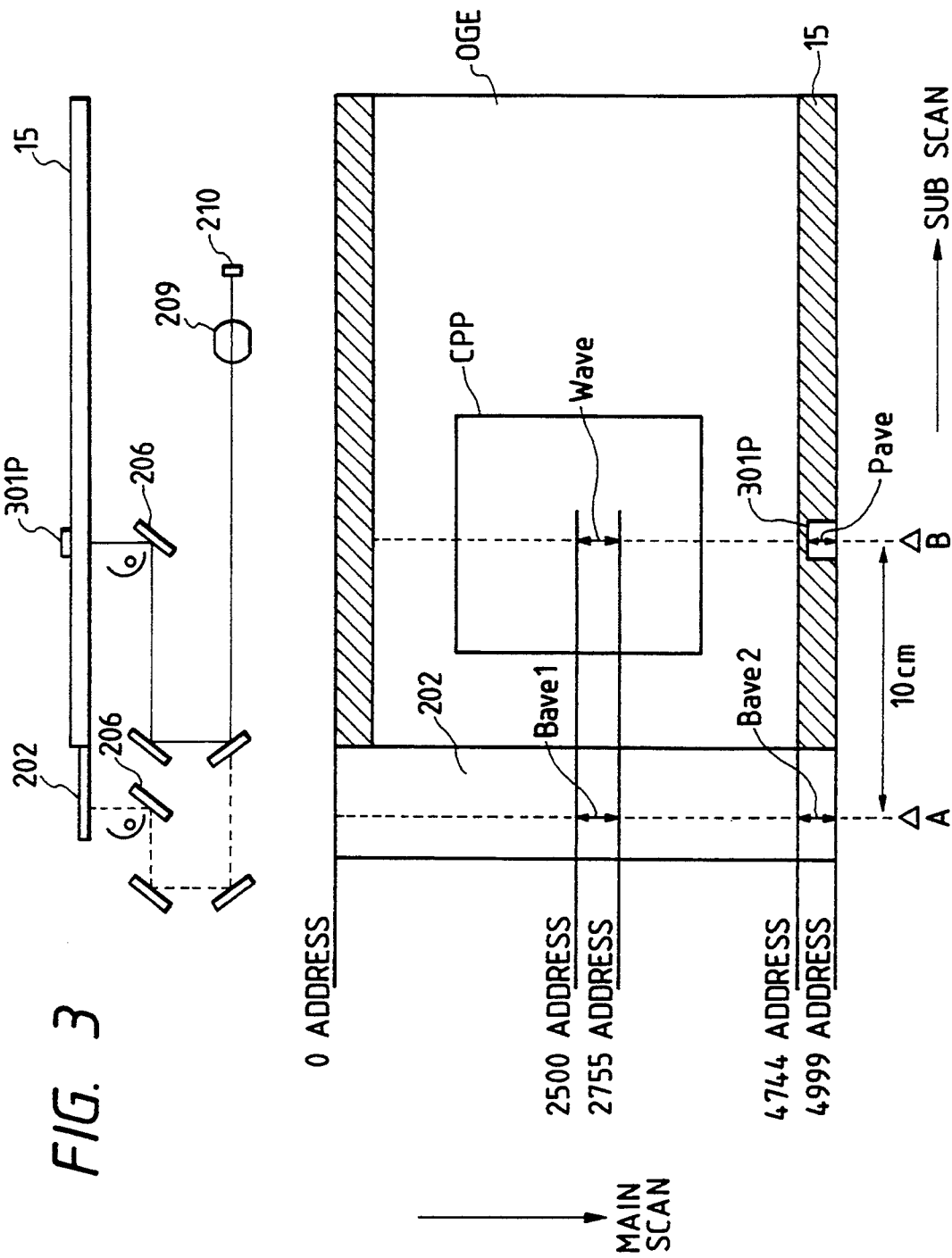
FIG. 3 is a diagram for explaining measurement of standard white plate density in one embodiment of the present invention.
Figure 4:
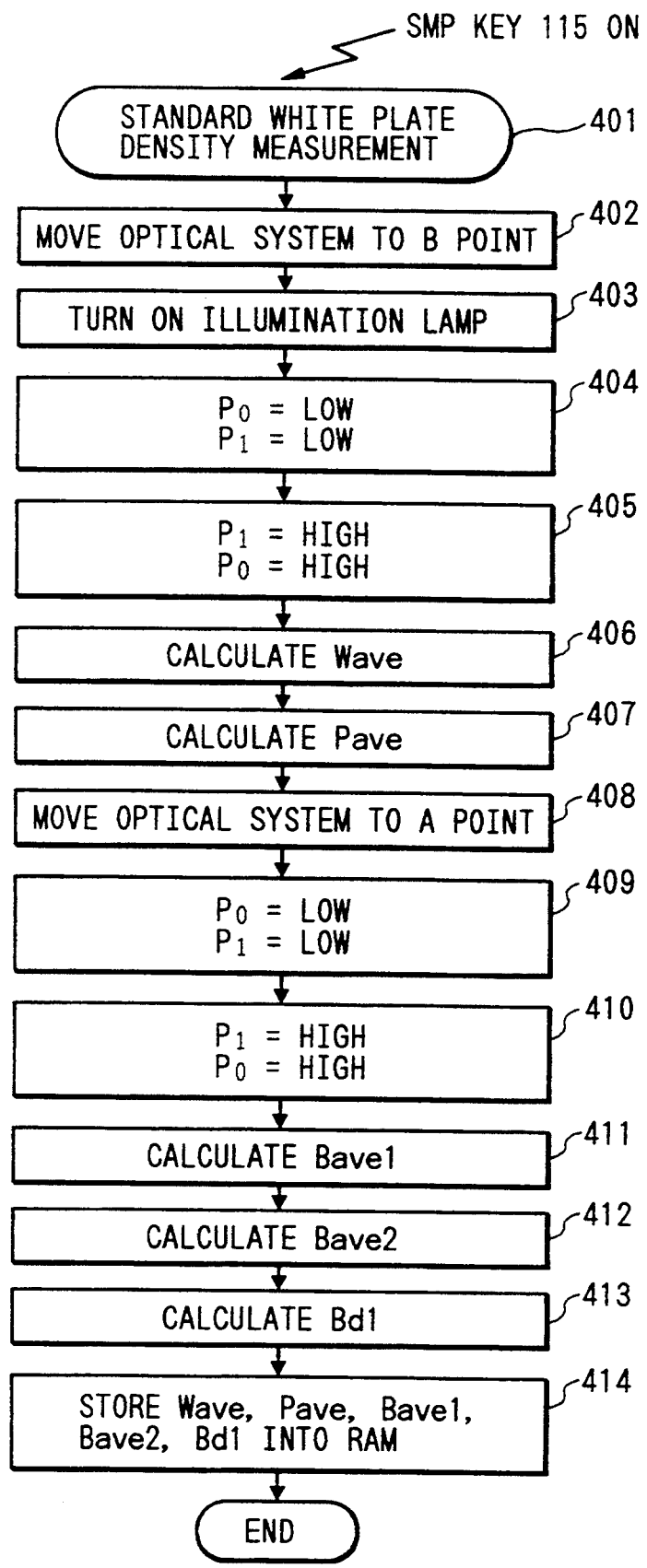
FIG. 4 is a control flowchart for measurement of standard white plate density in one embodiment of the present invention.

FIG. 3 shows a diagram for explaining density measurement of the standard white plate 202. FIG. 4 shows a flowchart of the measurement procedure.

In FIG. 3, denoted at 301P is a reference patch pasted onto a hatched region outside an original read area OGE over the platen glass 15, but within a readable rage of the CCD 210.

More specifically, the reference patch 301P has density of about 0.1 and pasted onto the platen glass 15 at the tail end in the direction of main scan at a B point spaced 10 cm from a standard white plate read position A in the direction of sub scan. The size of the patch 301P is selected to be 256 or more pixels enough to always cover the addresses from 4744 to 4999 of the CCD.

In this way, the reference patch 301P is not directly bared to the lamp 205 and the CCD 210, but exposed by the lamp 205 via the original platen glass 15. Accordingly, the patch 301P locates at the position coincident with the surface on which the original is actually place, is less likely to discolor, stain with depositions, or so, and causes no change in the density for a long term. Thus, a read signal of the patch 301P can be used as reference white of density 0.1 on the platen 15.

In a density measurement more of the standard white plate 202 shown in the flowchart of FIG. 4, the density Bd1 of the standard white plate 202 is measured based on both the read data from the standard white plate 202 and the read data from a reference white original over the platen.

In this mode, an operator places several sheets of copy paper, usually employed, over the orignal platen glass 15 one above another, followed by depressing a sample (SMP) key 115. A sheet of copy paper immediately after unsealing a paper pack has stable reflection density of about 0.05 and, therefore, can be handled as a reference white original.

Upon detecting the SMP key 115 being depressed, the CPU 106 enters the measurement mode for the standard white plate 202.

First, the CPU 106 drives the optical system for moving the mirror 206 to the B point spaced 10 cm from the standard white plate (step 402). It then turns on the lamp 205 (step 403).

Thereafter, the CPU 106 applies the CCD-ADR signal to the first memory 110 with the $P_0$ signal set to an L level, and writes the read signals DV of one line outputted from the CCD 210 in the memory 110 with the $P_1$ signal to an L level (step 404).

Subsequently, the CPU 106 sets both the $P_0$ and $P_1$ signals to an H level and reads the contents of the first memory 110 at the addresses from 2500 to 2755.

The address 2500 corresponds to almost the center of the original platen 15 in the direction of main scan, and an average value Wave of the read data from those 256 pixels in the central portion is calculated (step 406).

The CPU 106 then reads the data at the addresses from 4744 to 4999 of the first memory 110. These data are the read data from the reference patch 301P, and an average value Pave of the read data from those 256 pixels is calculated (step 407).

Next, the CPU 106 moves the optical system again for bringing the mirror 206 to the A point corresponding to the standard white plate 202. Subsequently, it sets both the $P_0$ and $P_1$ signals to an L level (step 409) and writes the video signals DV of one line from the standard white plate 202 in the memory 110. After returning both the $P_0$ and $P_1$ signals to an H level, an average value Bave1 of the data at the addresses from 2500 to 2755 of the memory 110 is calculated (steps 410, 411).

Since Bave1 is the read value from the standard white plate 202 based on the same pixels as those CCD pixels from which Wave has been calculated, the ratio of Bave1 to Wave is equal to the ratio of density of the standard white plate 202 to density of the copy sheet CPP in terms of light intensity conversion value.

Then, an average value Bave2 of the data at the addresses from 4744 to 4999 of the memory 110 is calculated (step 412).

Since Bave2 is the read value from the standard white plate 202 based on the same pixels as those CCD pixels from which Pave has been calculated, the ratio of Bave2 to Pave is equal to the ratio of density of the standard white plate 202 to density of the reference patch 301P in terms of light intensity conversion value.

The output DV of the A/D converter 102 is a light intensity signal having an 8-bit multivalue, and the CPU determines a density value of the standard white plate 202 from the ratio of the Wave signal to the Bave1 signal.

More specifically, if the light intensity conversion value for the density 0.05 of the copy sheet is normalized to a level of 255 in an 8-bit multivalue signal, the light intensity conversion value Bd1 for density of the standard white plate is given by $Bd1 = 255 \times (Bave1/Wave)$.

Because of the standard white plate 202 being painted substantially uniformly, the density value Bd1 calculated using the 256 pixels can be applied to the entire surface of the standard white plate 202.

The CPU 106 calculated Bd1 (step 413), followed by storing the respective values of Wave, Pave, Bave1, Bave2 and Bd1 in a non-volatile battery backup RAM 116.

In the original read operation immediately after the standard white plate density measurement mode executed by depressing the AMP key 115, the above-stated shading correction is performed by setting Bd=Bd1.

Standard White Plate Density Correction Mode

Meanwhile, with the read operation repeated for a long term, the density ratio Bd of the standard white plate 202 to the copy sheet CPP of density 0.05 on the platen is changed due to oil vapor and dust contained in the air. Stated otherwise, Bd1 calculated in the above standard white plate density measurement mode becomes different from the actual value of Bd. As a result, the proper shading correction is no longer effected so that the outputted VIDEO data are varied to be deeper or lighter than the actual original density. This is corrected by a standard white plate density correction mode shown in FIG. 5.

In this mode, without placing any reference copy sheet CPP of density 0.05 on the original platen 15, a density ratio Bd1' of the standard white plate 202 to the copy sheet on the original platen 15 in terms of light intensity conversion value at that time is equivalently determined by sampling both read data of the reference path 301P pasted onto the original platen 15 and the standard white plate 202.

This mode is automatically carried out during normal use of the original reader and, in this embodiment, is executed prior to the first original read operation after turning on the power.

As mentioned before, this mode is intended to correct relatively long-term changes of the read optical system due to such as stains caused in the read optical system. Therefore, executing this mode for each read operation is not so effective and simply consumes a time required for the read operation to execute this mode. For the reason, this mode is executed just once in this embodiment after power-on.

Further, in order to prevent the reader from operating with execution of this mode at the timing not intended by the operator, this mode is executed upon the read start key 114 being first depressed after power-on. This aims to prevent a serviceman or an operator from being injured with the input system suddenly actuated upon power-on, when the read optical system is bared during maintenance of the reader, for example.

Figure 6:
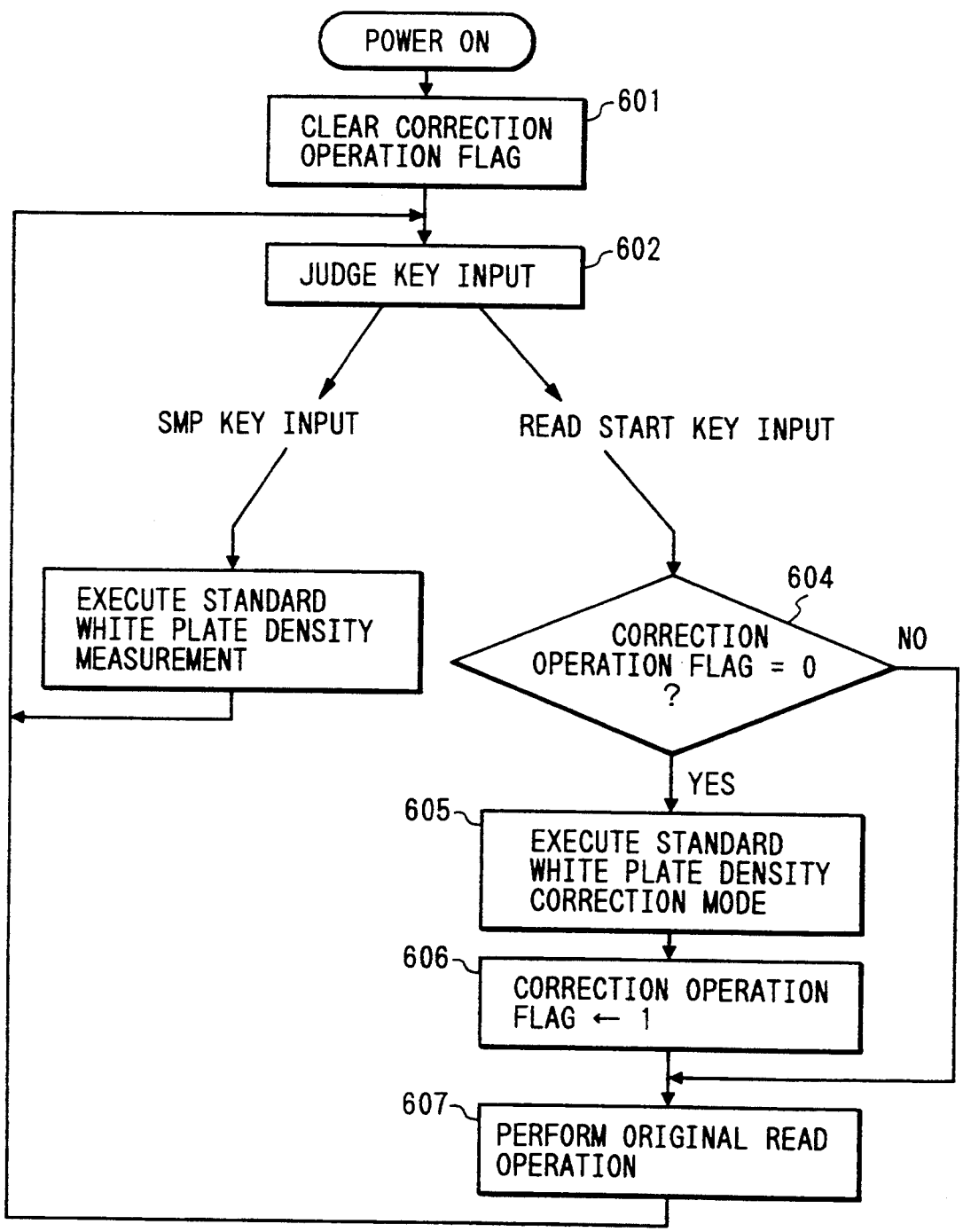
FIG. 6 is a control flowchart for a reader of one embodiment of the present invention.

FIG. 6 shows a control flow of the CPU relating to control for the read operation.

After power-on, a correction operation flag previously set in a memory built in the CPU 106 is cleared to 0 (step 601). The CPU 106 then waits for a key input (step 602).

If the SMP key 115 is inputted (or depressed), then the standard white plate density measurement mode shown in FIG. 4 is executed (step 603), followed by returning to the step 602 again.

If the read start key 114 is inputted, then the CPU checks whether or not the correction operation flag is 0 (step 604). If the flag is 0, meaning that the standard white plate density correction mode is not yet executed and, then it executes the standard white plate density correction mode of FIG. 5 (step 605) and sets the correction operation flag to 1 (step 606). Thereafter, the original read operation is performed (step 607).

If the correction operation flag is 1, meaning that the standard white plate density correction mode has been executed, then the CPU performs the original read operation and returns to the step 602.

Operation of the standard white plate density correction mode will be explained below by referring to the flowchart of FIG. 5.

Upon power-on, the CPU enters the standard white plate density correction mode and first moves the optical system to the B point where the reference patch 301P is present (step 502). It then turns on the lamp 205 (step 503).

Thereafter, by setting $P_0$=LOW and $P_1$=LOW, the CPU applies the CCD-ADR signal to the first memory 110 and writes the read signals DV of one line outputted from the CCD 210 in the memory 110 (step 504). Subsequently, the CPU sets both the $P_0$ and $P_1$ signals to an H level (step 505) and reads the contents of the first memory 110 at the addresses from 4744 to 4999 (step 506). These data are the read data from the reference patch 301P, and an average value Pave' of the read data from those 256 pixels is calculated.

Next, the CPU moves the optical system again for bringing it to the A point corresponding to the standard white plate 202 (step 507). Subsequently, it sets both the $P_0$ and $P_1$ signals to an L level and writes the video signals DV of one line from the standard white plate 202 in the memory 110 (step 508).

After returning both the $P_0$ and $P_1$ signals to an H level (step 509), an average value Bave2' of the data at the addresses from 4744 to 4999 of the memory 110 is calculated (steps 510).

Even if brightness of the illumination is changed due to dust and oil vapor, the ratio of Wave measured from the copy sheet at the addresses from 2500 to 2755 to Pave measured from the reference patch 301P remains the same so long as shading configuration of the illumination is not changed. Accordingly, assuming that the value resulted by reading the copy sheet of density 0.05 on the platen under an illumination condition at the time of executing this mode is Wave', Wave' can be calculated based on Wave'=(Pave'/Pave)×Wave.

Likewise, the ratio of Bave1 to Bave2 also remains the same. Therefore, assuming that the value resulted from the standard white plate at the addresses from 2500 to 2755 under a stained condition thereof and an illumination condition at the time of executing this mode is Bave1', Bave1' can be calculated based on Bave'=(Bave2'/Bave2)×Bave1.

Under the conditions of the standard white plate and illumination at the time of executing this mode, too, a target value Bd1' for correcting the read value from the standard white plate through the shading correction so that the value Wave' for a white copy sheet on the platen is normalized to 255, is given by Bd1'=255×(Bave1'/Wave').

Putting Bave1' and Wave' into the above equation results in the following equation:

$$\begin{aligned} Bd1' &= 255 \times \frac{Bave1}{Wave} \times \frac{Bave2'/Pave'}{Bave2/Pave} \\ &= Bd1 \times \frac{Bave2'/Bave2}{Pave'/Pave} \\ &= Bd1 \times \frac{Bave2'/Pave'}{Bave2/Pave} \end{aligned} \quad (1)$$

This implies that Bd1 is corrected by using a change rate of Bave2 and a change rate of Pave.

Stated differently, this also implies that Bd1 is corrected by using both the ratio Bave2/Pave of the measured value Bave2 of the standard white plate from those CCD pixels corresponding to the reference patch 301P to the measured value Pave of the patch, these values being calculated in the standard white plate density measurement mode, and the ratio Bave2'/Pave' of Bave2' to Pave' calculated in the standard white plate density correction mode, to thereby obtain the target value Bd1' for the shading correction applied to the read data from the standard white plate during the execution of this mode. In this embodiment, therefore, the ratio data of Pave to Bave2 may be stored in the battery backup RAM.

The CPU calculates Bd1' (step 511), followed by bringing the standard white plate density correction mode to an end.

In the subsequent original read operation, the above-stated shading correction is performed by setting the light intensity conversion value of standard white plate density as Bd=Bd1'.

In this case also, when a copy sheet of density 0.05 plated on the original platen 15 is read through the shading correction, the VIDEO signal from each pixel of the CCD 210 is given as 255 equal to the value set by normalization in the standard white plate density measurement mode.

While the standard white plate density correction mode is executed prior to the original read operation after power-on in this embodiment, it may be executed subsequent to the original read operation immediately after power-on for the purpose of speeding up start of the original read operation. Also, the original read operation may be started upon, rather than a key input, an instruction such as an original read start con, hand communicated from an external VIDEO signal take-in device (not shown) or the like.

Although the standard white plate density correction mode is executed in synchronism with the first original read operation after power-on in the above embodiment, an operator may feel annoying in such a case as desiring the quick original read operation if the standard white plate density correction mode is executed per power-on. Taking into account such situation, the following modified embodiment includes an execution authorization key for the standard white plate density correction mode on the control panel.

Figure 7:
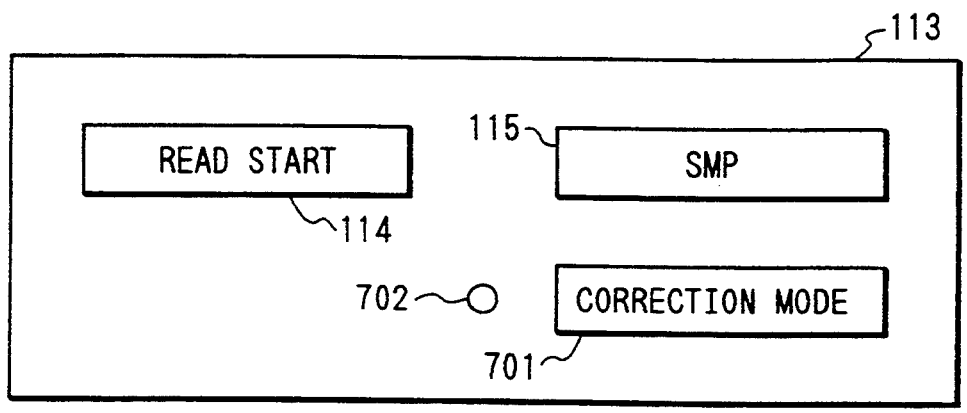
FIG. 7 is a view showing an operation unit in one modified embodiment of the present invention.

FIG. 7 shows details of the control panel 113 used in this embodiment.

In FIG. 7, the same parts as those in FIG. 1 are denoted at common reference numerals. A correction mode key 701 is an ON/OFF key for designating whether or not to execute the standard white plate density correction mode explained in the above embodiment. 702 is an LED indicating whether or not the standard white plate density correction mode is authorized at present. Turning-on of the LED 702 implies that the standard white plate density correction mode is authorized.

FIG. 8 shows a control flow of the CPU relating to control for the read operation in this embodiment.

After power-on, the CPU 106 clears the correction operation flag (step 801). Then, by checking a correction authorization flag (step 802), it turns on the LED 702 if the flag is 1 (step 803), and turns oil the LED 702 if the flag is 0 (step 804). The correction authorization flag is set on the non-volatile battery backup RAM 116 accessible by the CPU, and holds the state set before power-off.

Next, the CPU checks a key input from the control panel (step 805). If the SMP key 115 is inputted, then the standard white plate density measurement mode shown in FIG. 4 is executed (step 806).

If the read start key 114 is inputted, then the CPU checks the correction authorization flag (step 807). If the correction authroization flag is OFF (meaning unauthorization), then it performs the original read operation (step 811). If the correction authorization flag is OFF (meaning authorization), then it checks the correction operation flag (step 808) and executes the standard white plate density correction mode at only the first document read operation after power-on (step 809).

If the correction mode key 701 is inputted, then the CPU inverts the correction authorization flag (step 813), followed by returning to steps 802, 803, 804 to make turning-on control of the LED 702 depending on the state of the correction operation flag.

Thus, this embodiment has ON/OFF means for designating whether or not to automatically execute the standard white plate density correction mode.

In this embodiment, too, the original read operation may be started upon, rather than a key input, an instruction such as an original read start command communicated from an external device, like the above embodiment.

As mentioned before, when the standard white plate density correction mode is executed is synchronism with the first original read operation after power-on, i.e., per power-on, an operator may feel annoying in such a case as desiring the quick original read operation. Also, in the reader used with the power continuously kept turned on, the standard white plate density correction mode will never be executed because the operation of turning on the power is noted effected.

Taking into account such situation, the following modified embodiment includes a standard white plate density correction mode execution key on the control panel. Upon this key being depressed by the operator, the standard white plate density correction mode is executed.

Figure 9:
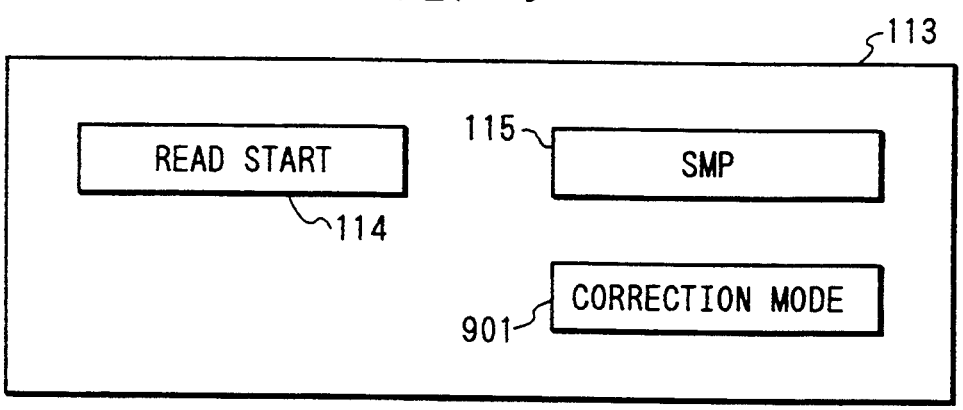
FIG. 9 is a view showing an operation unit in another modified embodiment of the present invention.

FIG. 9 shows details of the control panel 113 for use in this embodiment.

In FIG. 9, the same parts as those in FIG. 1 are denoted at common reference numerals. A correction mode key 901 is a key for designating whether or not to execute the standard white plate density correction mode explained in the above embodiments.

Figure 10:
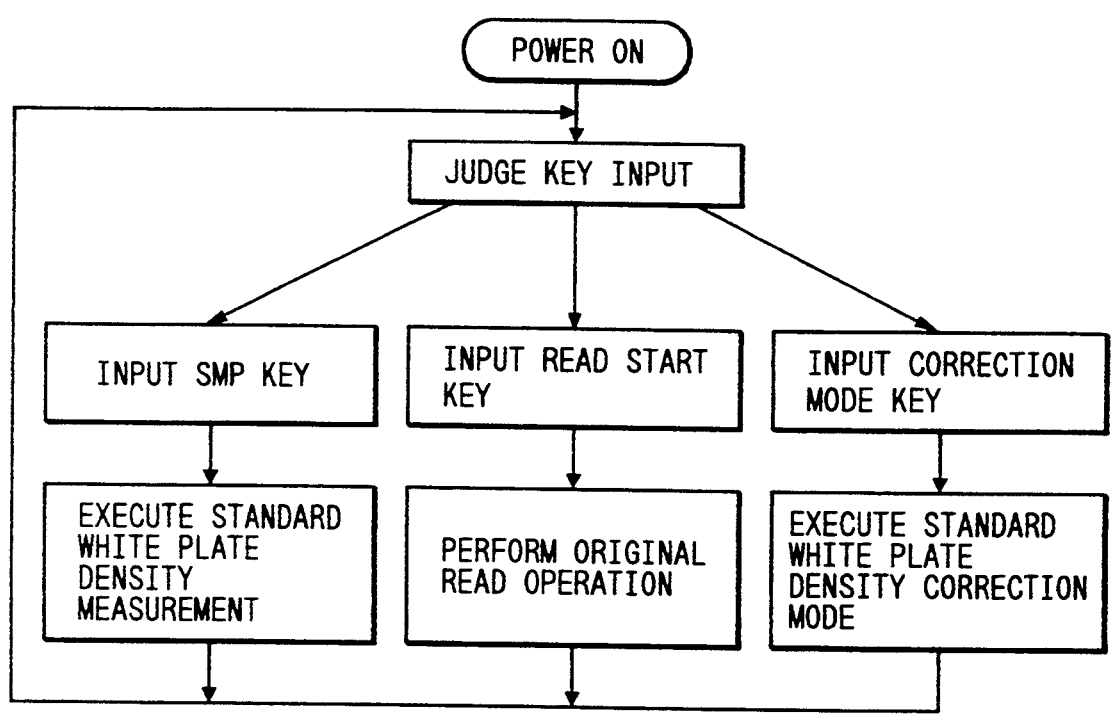
FIG. 10 is a control flowchart for a reader of another modified embodiment of the present invention.

FIG. 10 shows a control flow of the CPU relating to control for the read operation in this embodiment. As shown, depending on a key input from the SMP key 115, the read start key 114 or the correction mode key 901, the standard white plate density measurement mode, the original read operation or the standard white plate density correction mode is executed, respectively.

Note that the standard white plate density correction mode is executed depending on not only a key input from the correction mode key, but also the conditions that the standard white plate density measurement mode is note being executed and that the original read operation is not being performed.

In this embodiment, too, the original read operation may be started upon, rather than a key input, an instruction such as an original read start command communicated from an external device, like the above embodiments. Similarly, the standard white plate density correction mode may also be started upon an instruction such as a correction start command communicated from an external device.

As mentioned before, when the standard white plate density correction mode is executed in synchronism with the first original read operation after power-on, the standard white plate density correction mode will never be executed in the reader used with the power continuously kept turned on, because the operation of turning on the power is not effected.

Taking into account such situation, the following modified embodiment is to execute the standard white plate density correction mode when the number of original read operations reaches or exceeds a predetermined value. In this embodiment, the standard white plate density correction mode is executed, by way of example, each time 100 or more sheets of originals are read.

The control panel for use in this embodiment is the same as that in the embodiment shown in FIG. 1.

Figure 11:
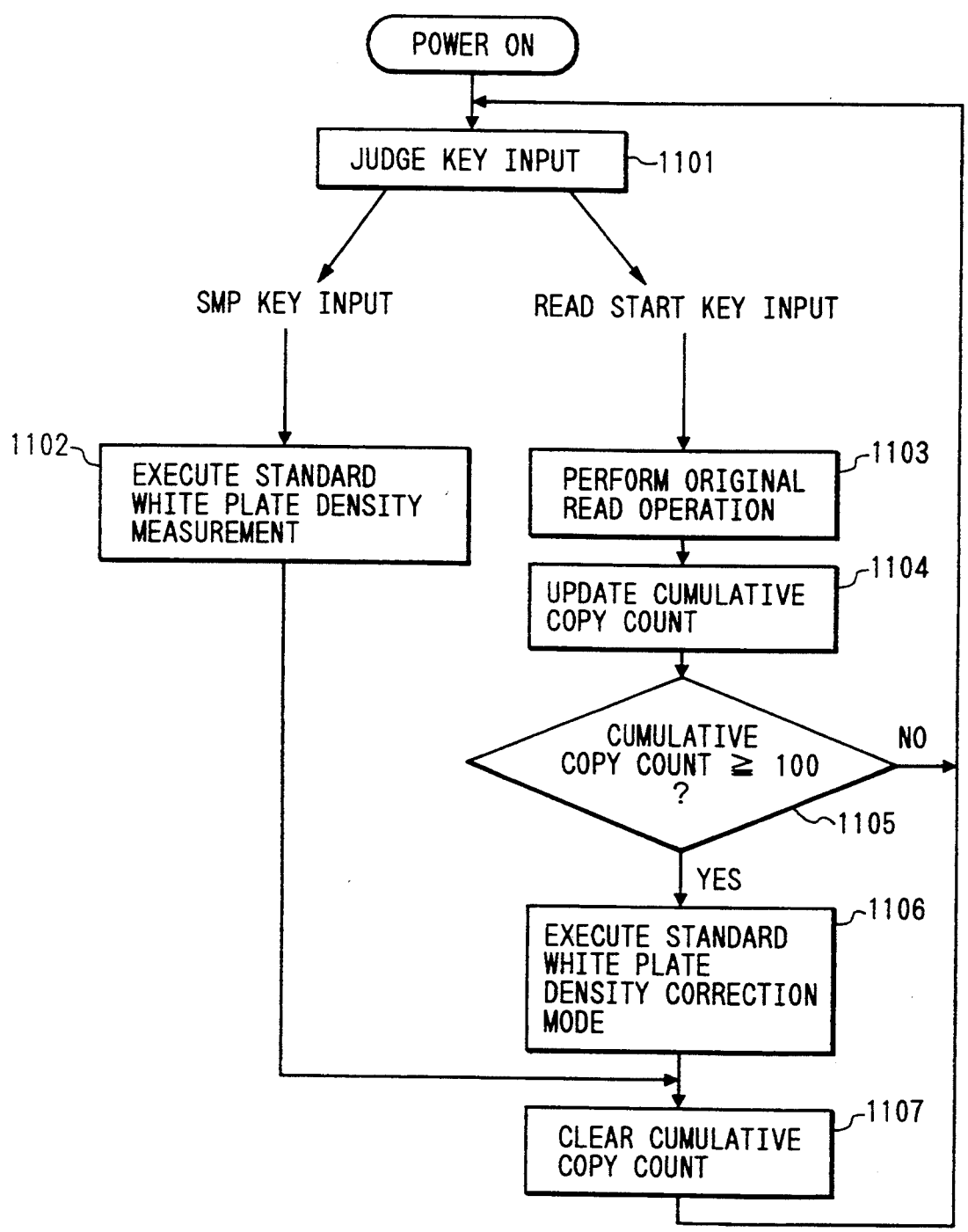
FIG. 11 is a control flowchart for a reader of still another modified embodiment of the present invention.

FIG. 11 shows a control flow of the CPU relating to control for the read operation in this embodiment. After power-on, the CPU 106 judges a key input (step 1101). If the SMP key 115 is inputted, then it executes the standard white plate density measurement mode (step 1102). This implies that the density value of the standard white plate has been measured from a copy sheet of density 0.05 on the platen and, therefore, the value of cumulative copy count data is cleared to zero (step 1107).

If the read start key 114 is inputted, then the CPU performs the original read operation (step 1103). Herein, for example, the original read operation is carried out by reading originals in the number of times designated from number-of-read-times designating means (not shown) comprising a ten-key pad or the like.

Then, the cumulative copy count data is incremented by the number of read times effected at that time (step 1104). The cumulative copy count data is set on the non-volatile battery backup RAM 116 accessible by the CPU, and holds the set state even after power-off. The value of the cumulative copy count data represents the number of read times from execution of the last standard white plate density measurement mode or the last standard white plate density correction mode to now.

Next, the CPU checks the cumulative copy count data after a series of original read oprations (step 1105). If the cumulative copy count data is equal to or more than a predetermined value (100), then the standard white plate density correction mode is executed upon the judgment that a density level of the video data is varied by an influence due to stains of the read optical system or other reasons (step 1106), followed by clearing the value of cumulative copy count data to zero (step 1107).

On the other hand, if the value of cumulative copy count data does not reach 100, then the CPU waits for a key input again in the step 1101.

In this embodiment, too, the original read operation may be started upon, rather than a key input, an instruction such as an original read start command communicated from an external device, like the above embodiments.

Further, in this embodiment, when the cumulative copy count data reaches or exceeds the predetermined value, it is also possible to, rather than executing the standard white plate density correction mode at once, check the value of cumulative copy count data before the next original read operation and, if the data is equal to or more than the predetermined value at that time, execute the standard white plate density correction mode and then perform the original read operation. Alternatively, the CPU may check the value of cumulative copy count data during the first original read operation at power-on and, if the data is equal to or more than the predetermined value at that time, execute the standard white plate density correction mode.

This embodiment may also include means for judging whether or not executing the standard white plate density correction mode is authorized, as with the embodiment shown in FIG. 7, so that the standard white plate density correction mode will not be executed even when the cumulative copy count data reaches the predetermined value. As is this case, where the cumulative copy count data reaches the predetermined value, but the standard white plate density correction mode should not be executed, the value of cumulative copy count data is not cleared to zero.

In the embodiment of FIG. 11, the standard white plate density correction mode is executed when the number of original read times becomes equal to or more than a predetermined value. However, even when the reader is left with the power kept turned on without effecting any original read operations, dust or the like in the open air may enter the interior of the reader due to operation of a fan for cooling the illumination lamp, for exmaple, and thus stain the optical system. As a result, there occurs a deviation between a level of the read video signal and the actual original density. Taking into account such situation, the following modified embodiment is to execute the standard white plate density correction mode when a cumulative energization time of the reader becomes equal to or more than predetermined value.

In this embodiment, the standard white plate density correction mode is executed for each period of cumulative energization time not less than 10 hours (36,000 seconds).

Figure 12:
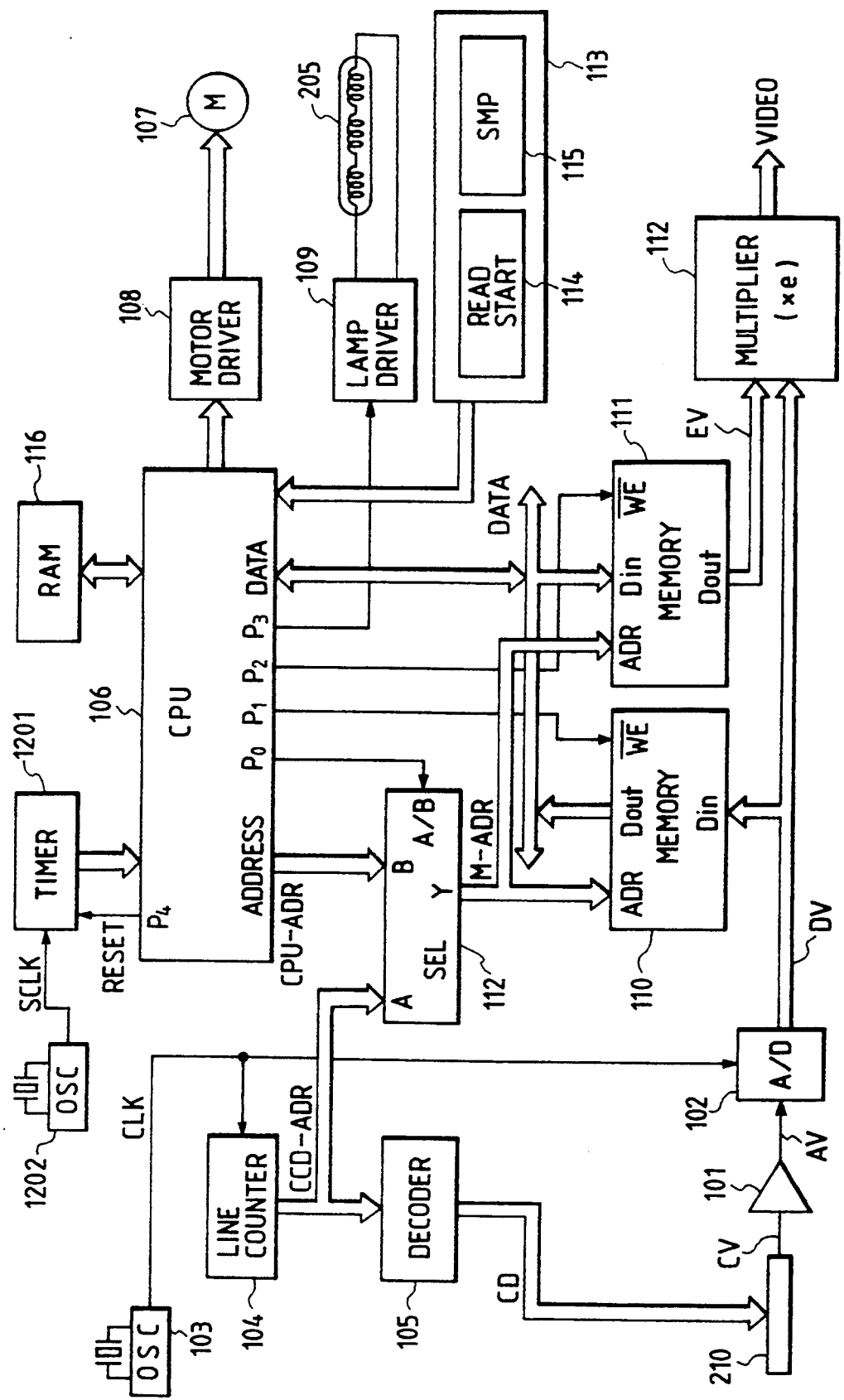
FIG. 12 is a signal processing block diagram of still another modified embodiment of the present invention.

FIG. 12 shows a control block for this embodiment. As compared with the arrangement of FIG. 1, a timer 1201 is herein added in association with the CPU 106. The timer 1201 counts a clock SCLK produced from an oscillator 1202 in units of one second. The timer 1201 is reset by an output from a port P4 of the CPU 106 and a counted value of the timer 1201 is read by the CPU 106. The control panel 113 for use in this embodiment is the same as that in the embodiment of FIG. 1.

FIG. 13 shows a control flow of the CPU 106 relating to control for the read operation in this embodiment. After power-on, the CPU 106 resets the timer 1201 (step 1301) and, thereafter, judges a key input (step 1302).

If the SMP key 115 is inputted, then it executes the standard white plate density measurement mode (step 1303). This implies that the present correct density of the standard white plate 202 has been measured and, therefore, the value of cumulative timer count data (described later) is cleared to zero (step 1304).

If the read start key 114 is inputted, then the CPU 106 reads the value of the timer 1201 and resets the timer 1201 (step 1305). The value of cumulative timer count data is then incremented by the timer value read at that time (step 1306).

The cumulative timer count data is set on the non-volatile battery backup RAM 116 accessible by the CPU 106, and holds the set state even after power-off. The value of cumulative timer count data represents a cumulative energization time from execution of the last standard white plate density measurement mode or the last standard white plate density correction mode to now.

Next, the CPU checks the cumulative timer count data (step 1307). If the cumulative timer count data is in excess of a predetermined value (36,000 seconds), then the standard white plate density correction mode is executed upon the judgment that a density level of the video data is varied by an influence due to stains of the read optical system or other reasons (step 1308), followed by clearing the value of cumulative timer count data to zero (step 1309).

On the other hand, if the value of cumulative copy count data does not reach 36,000 seconds, then the original read operation is performed (step 1310).

In this embodiment, too, the original read operation may be started upon, rather than a key input, an instruction such as an original read start command communicated from an external device, like the above embodiments.

Further, in this embodiment, rather than checking the value of cumulative timer count data before the original read operation and executing the standard white plate density correction mode, it is also possible to check the value of cumulative timer count data upon the end of the original read operation and, if the data is equal to or more than the predetermined value at that time, execute the standard white plate density correction mode.

Alternatively, the CPU may update the cumulative timer count data during the judgment of a key input in the step 1302, and execute the standard white plate density correction mode regardless of the original read operation.

This embodiment may also include means for judging whether or not executing the standard white plate density correction mode is authorized, as with the embodiment stated above, so that the standard white plate density correction mode will not be executed even when the cumulative copy timer data reaches the predetermined value. As is this case, where the cumulative timer count data reaches the predetermined value, but the standard white plate density correction mode should not be executed, the value of cumulative timer count data is not cleared to zero.

In the above-mentioned embodiment of FIG. 9, the control panel has the standard white plate density correction mode execution key. Upon this key being depressed by an operator, the standard white plate density correction mode is executed.

The following modified embodiment is arranged to detect the fact that the number of original read times becomes equal to or more than a predetermined value, as with the embodiment shown in FIG. 11, and informs the operator or an external device of the necessity of executing the standard white plate density correction mode. In this embodiment, by way of example, the necessity of executing the standard white plate density correction mode is formed each time 100 or more sheets of originals are read.

Figure 14:
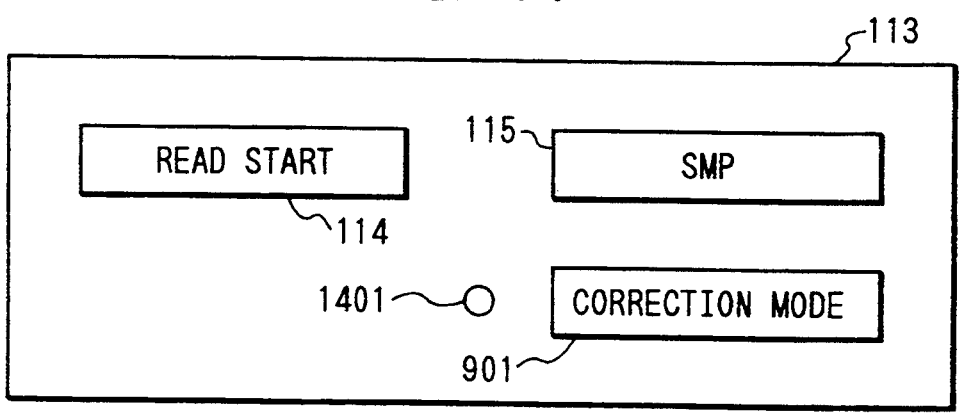
FIG. 14 is a view showing an operation unit in still another modified embodiment of the present invention.

FIG. 14 shows details of the control panel 113 for use in this embodiment.

In FIG. 14, the same parts as those in FIG. 1 are denoted at common reference numerals. The correction mode key 901 is a key for designating whether or not to execute the standard white plate density correction mode explained in the above embodiments. An LED 1401 is an LED for informing the operator of execution of the standard white plate density correction mode, the LED being turned on when informing the execution and turned off after the standard white plate density measurement mode or the standard white plate density correction mode has been executed.

Figure 15:
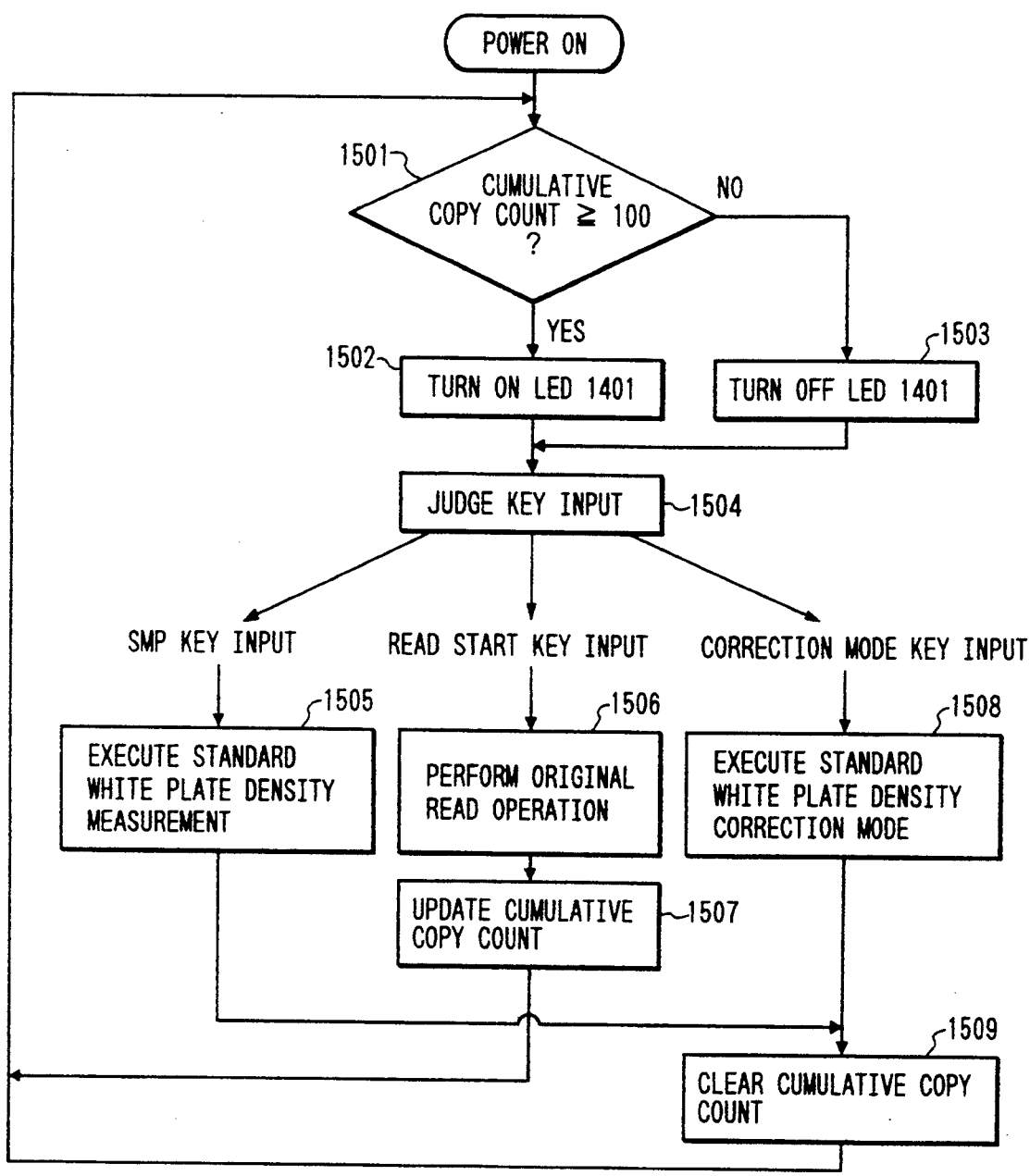
FIG. 15 is a control flowchart for a reader of still another modified embodiment of the present invention.

FIG. 15 shows a control flow of the CPU 106 relating to control for the read operation in this embodiment. After power-on, the CPU makes turning-on control of the LED 1401 depending on the value of cumulative copy count data through the steps 1501, 1502, 1503. Then, as shown, depending on a key input from the SMP key 115, the read start key 114 or the correction mode key 901, the standard white plate density measurement mode, the original read operation or the standard white plate density correction mode is executed in steps 1505, 1506 or 1508, respectively.

After the original read operation, the value of cumulative copy count data is incremented by the number of original read times in a step 1507 and, depending on the resultant value, the turning-on control of the LED 1401 is made in the steps subsequent to 1501.

The value of cumulative copy count data is cleared in a step 1509 after executing the standard white plate density measurement mode and the standard white plate density correction mode in the steps 1505 and 1508, respectively.

The cumulative copy count data used herein is the same as that in the embodiment of FIG. 11.

In this embodiment, too, the original read operation may be started upon, rather than a key input, an instruction such as an original read start command communicated from an external device, like the above embodiments. Also, the necessity of the standard white plate density correction mode may be informed by not only the LED indication, but also communication of status information or the like to the external device.

Further, informing the notice herein the necessity of the standard white plate density measurement mode, besides the necessity of the standard white plate density correction mode. In response to the notice informed, therefore, the operator or the external device may execute the standard white plate density measurement ky a key input or a command through communication means.

While the necessity of executing the standard white plate density correction mode is informed depending on the cumulative number of original read operations in the embodiment of FIG. 15, the necessity of executing the standard white plate density correction mode is informed depending on a cumulative energization time in the following modified embodiment as with the embodiment of FIG. 13. The control unit for use in this embodiment is the same as that in FIG. 14. As the control block, use is made of that in FIG. 12.

Figure 16:
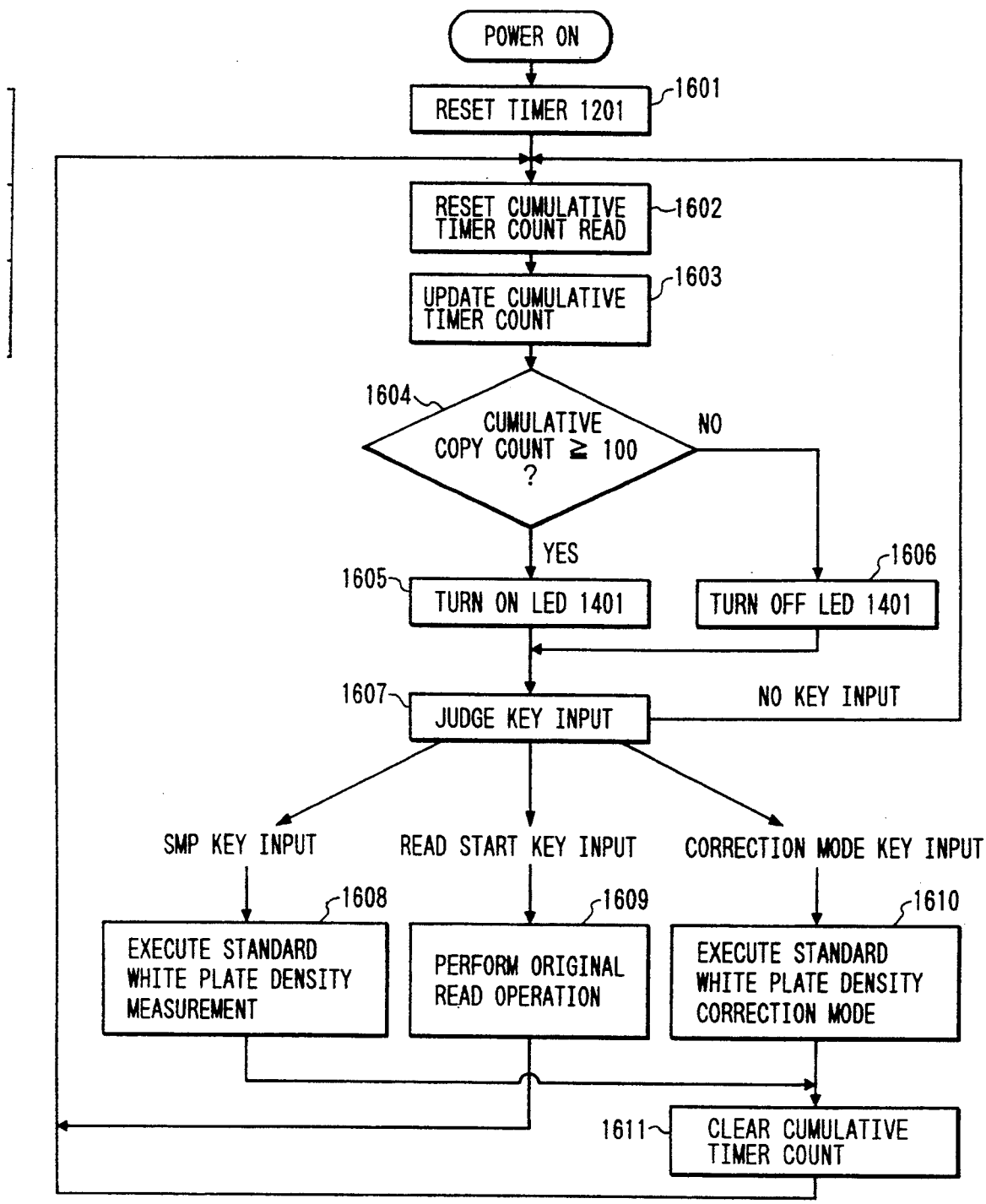
FIG. 16 is a control flowchart for a reader of still another modified embodiment of the present invention.

FIG. 16 shows a control flow of the CPU 106 in this embodiment. The cumulative timer count used herein is identical to that used in FIG. 13.

After power-on, the CPU resets the timer 1201 in a step 1601. Thereafter, it reads a count value (in units of second) of the timer 1201 in a step 1602 and updates the value of cumulative timer count data in a step 1603. Based on the value of cumulative timer count data, turning-on control of an LED 1401 is made through steps 1604, 1605 and 1606.

Next, the CPU judges a key input in a step 1607 and executes the processing depending on the key inputted. If no key input is applied, then it returns to the step 1602 for updating the value of cumulative timer count data.

The value of cumulative timer count data is cleared in a step 1611 after executing the standard white plate density measurement mode and the standard white plate density correction mode in the steps 1608 and 1610, respectively.

In this embodiment, too, the original read operation may be started upon, rather than a key input, an instruction such as an original read start command communicated from an external device, like the above embodiments. Also, the necessity of the standard white plate density correction mode may be informed by not only the LED indication, but also communication of status information or the like to the external device.

As explained above, by providing a reference patch of predetermined density outside the original read area, means for measuring changes in a read signal from the patch and a read signal from a standard density plate (standard white plate), and means for controlling execution of the measurement means, thereby carrying out brightness measurement of the standard density plate at necessary and sufficient frequency without affecting the read operation, the interval of cleaning the optical system by an operator is prolonged and stability of the reader is improved.

Further, by executing the standard white plate density correction mode depending on an extent of actual stains of the reader, or by informing the standard white plate density correction mode and/or the standard white plate density measurement mode, this is effective in minimizing a period of unusable time of the reader due to the correction operation, and also reducing the running cost of the reader.

In short, as described hereinabove, in such an arrangement that unevenness of a video signal obtained by reading an image of an original is corrected on the basis of a first standard signal obtained by reading a first standard member provided outwardly of a platen on which the original is to be placed, correction operation for such unevenness of the video signal is compensated on the basis of a second standard signal obtained by reading a second standard member provided on the platen, and this correction operation is authorized as required. Consequently, it is possible to eliminate a wasteful time and always correct the unevenness of the video signal with satisfactory results.

Figure 17:
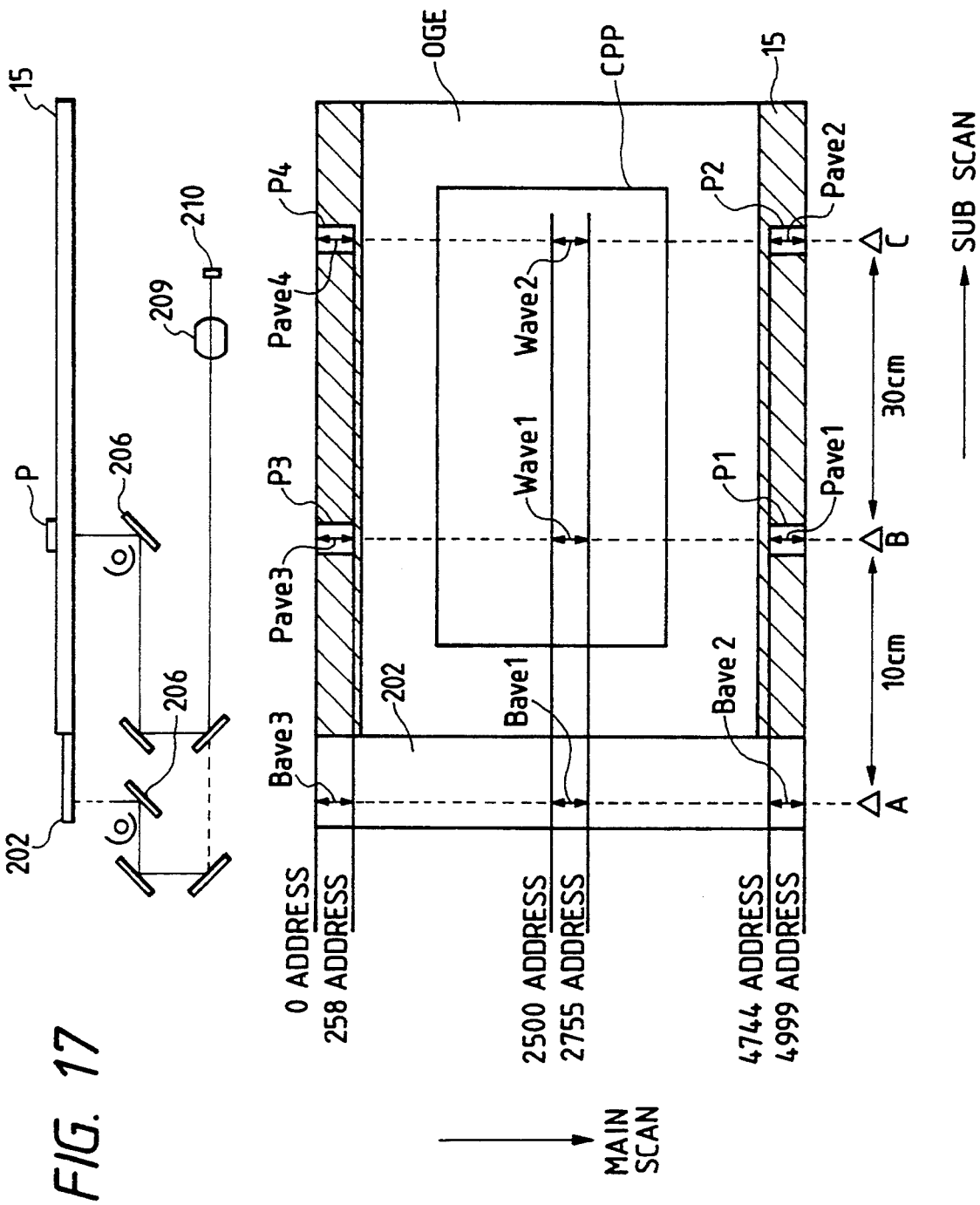
FIG. 17 is a diagram for explaining measurement of standard white plate density in another embodiment of the present invention according to a second aspect.
Figure 18:
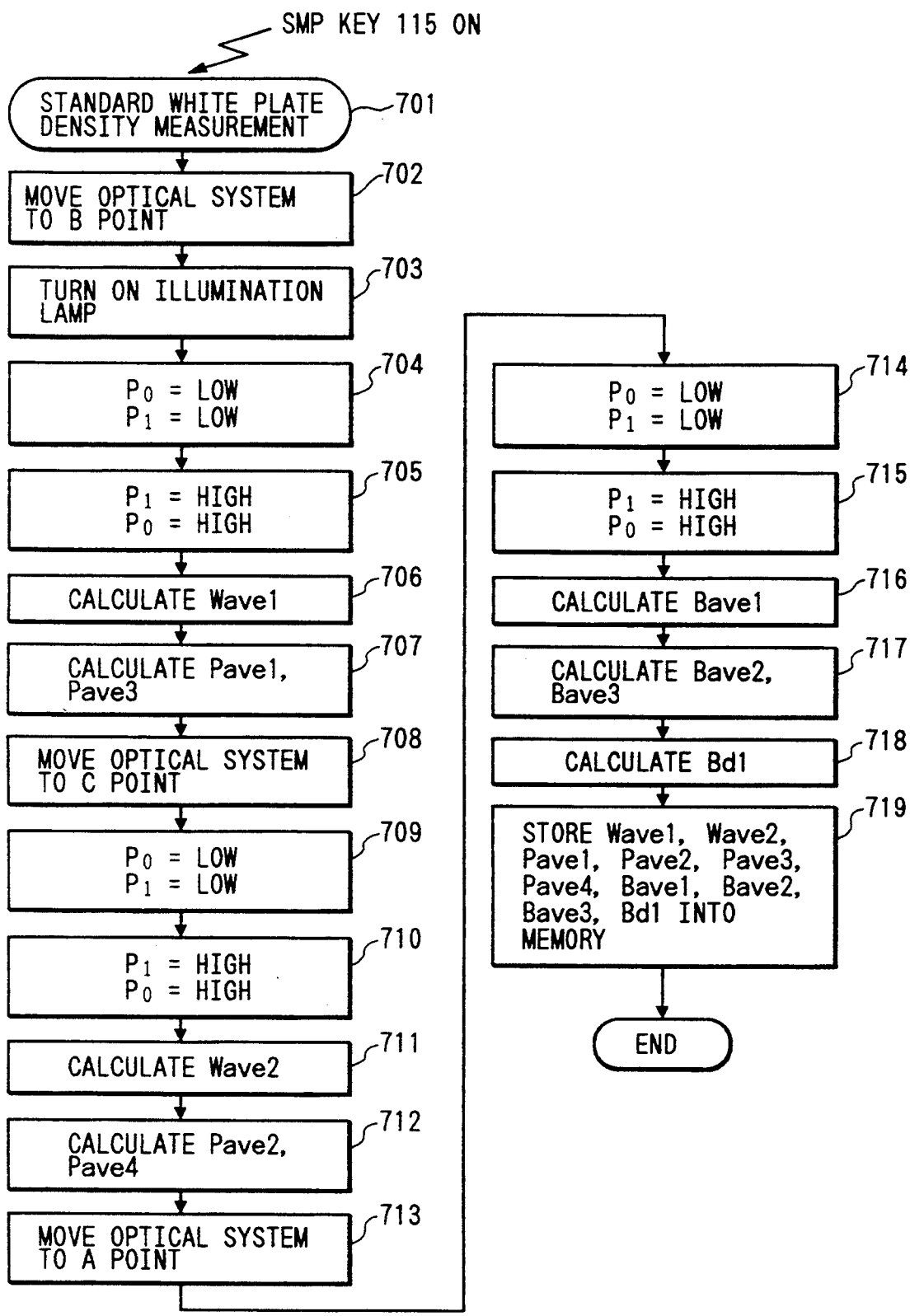
FIG. 18 is a control flowchart for measurement of standard white plate density in another embodiment of the present invention.

FIG. 17 shows a diagram for explaining density measurement of the standard white plate 202 in another embodiment of the present invention according to second aspect. FIG. 18 shows a flowchart for the measurement procedure.

In the embodiment of FIG. 17, total four reference patches are disposed at corners of an imaginary rectangle spaced both in the direction of main scan and in the direction of sub scan.

A reference patch P1 is located, like the patch 301P in the embodiment of FIG. 3, on the rear side in the direction of main scan (corresponding to main-scan addresses 4744 to 4999) and on the front side in the direction of sub scan (at a B position spaced 10 cm from the standard white plate in the direction of sub scan). A reference patch P2 is located at the same position as P1 in the direction of main scan and on the rear side in the direction of sub scan (at a C position 30 cm behind the B position). A reference patch P3 is located on the front side in the direction of main scan (corresponding to main-scan addresses 0 to 255) and on the front side in the direction of sub scan (at the B position). A reference patch P4 is located on the front side in the direction of main scan (corresponding to main-scan addresses 0 to 255) and on the rear side in the direction of sub scan (at the C position).

By providing the reference patches P1 to P4 at the above four points, this embodiment is to execute the density correction mode for the standard white plate 202 depending on differences in stain of the optical system and the standard white plate 202 in the direction of main scan, as well as differences in illumination condition in the direction of sub scan.

Standard White Plate Density Measurement Mode

In this mode, as with the embodiment of FIG. 4, an operator places several sheets of copy paper, usually employed and having reflection density of 0.05, over the original platen 15 one above another, followed by depressing the SMP key 115.

Upon detecting the SMP key 115 being depressed, the CPU turns on the lamp 205, moves the mirror 206 to the B position, and further calculates average values Pave1, Pave3, Wave1 of read signals respectively from the patch P1, P3 and the copy sheet CPP, in a like manner to the foregoing embodiment (steps 701 to 707).

Then, the CPU moves the optical system again for bringing the mirror 206 to the C position, and calculates average values Pave2, Pave4, Wave2 of read signals respectively from the patch P2, P4 and the copy sheet CPP, in a like manner to the foregoing embodiment (steps 708 to 712).

Next, the CPU moves the optical system to the position of the standard white plate 202 (i.e., the A position), and calculates an average value Bave3 of read signals from the main-scan addresses 0 to 255 corresponding to the patches P3, P4, in a like manner to the foregoing embodiment.

Further, the CPU calculates an average value Bave1 of read signals from the main-scan addresses 2500 to 2755 corresponding to Wave1, Wave2. It also calculates an average value Bave2 of read signals from the main-scan addresses 4744 to 4999 corresponding to the patches P1, P2 (steps 713 to 717).

Here, the ratio of Bave1 to Wave1 is equal to the ratio of density of the standard white plate to density of the copy sheet at the B position in terms of light intensity conversion value, as with the foregoing embodiment. If the light intensity conversion value for the density 0.05 of the copy sheet is normalized to a level of 255 in an 8-bit digital signal, the light intensity conversion value Bd11 for density of the standard white plate is given by Bd11=255×(Bave1/Wave1).

Also, the light intensity conversion value Bd12 for density of the standard white plate based on the read value Wave2 of the copy sheet at the C position in the direction of sub scan is given by Bd12=255×(Bave2/Wave2).

When scanning the optical system in the direction of sub scan, the read signal values are not always equal to each other on the front and rear sides in the direction of sub scan even with the same original being read, due to minute distortions in parallelism of the mirrors 206, 207, 208 and/or distortions in mount angles of those mirrors.

For that reason, in this embodiment, the read signals from the copy sheet of density 0.05 are obtained from two points spaced in the direction of sub scan, and the light intensity conversion values Bd11, Bd12 for density of the standard white plate 202 are obtained from the read signals, respectively, followed by setting an average value of Bd11 and Bd12 as a density value Bd1 of the standard white plate.

Like the foregoing embodiment, the CPU stores the respective values of Wave1, Wave2, Pave1, Pave2, Pave3, Pave4, Bave1, Bave2, Bave3 and Bd1 in a non-volatile memory (step 719).

Then, in the original read operation immediately after the standard white plate density measurement mode, the shading correction is performed by setting Bd=Bd1 similarly to the foregoing embodiment.

Standard White Plate Density Correction Mode

As mentioned before, with the read operation repeated for a long term, the Bd value is changed due to the presence of dust and oil vapor. Additionally, the extent of stains of the mirrors is not always even in the direction of main scan.

Figure 19:
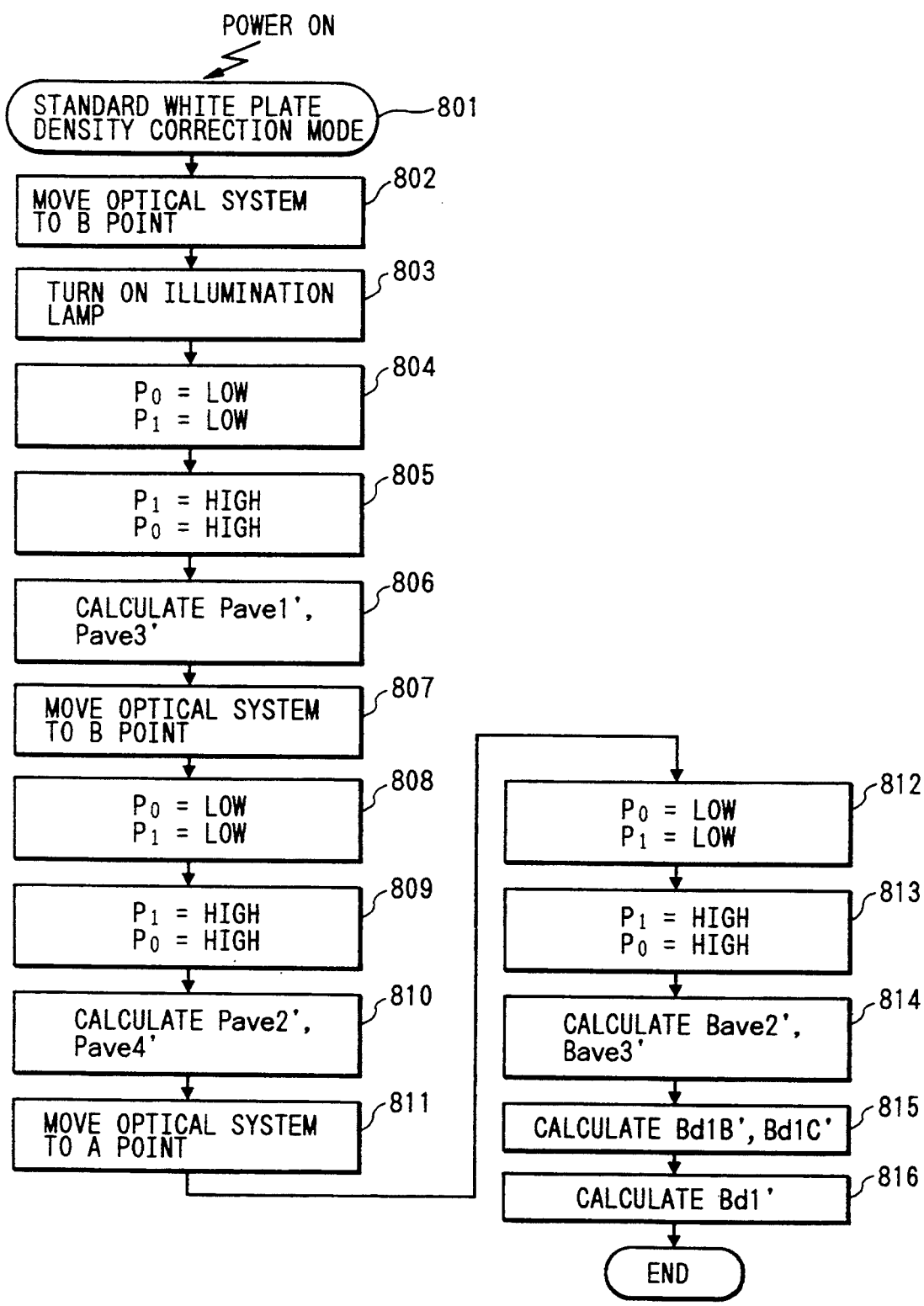
FIG. 19 is a control flowchart for correction of standard white plate density in another embodiment of the present invention.

To optimally correct changes in the Bd value in the direction of main scan caused by such unevenness of stains and changes in read condition in the direction of sub scan caused by variations in mount accuracy of the mirror systems, in this mode, a density ratio Bd1' of the standard white plate to the copy sheet in terms of light intensity conversion value at present is equivalently determined in accordance with the procedure shown in FIG. 19 by using the read values Pave1', Pave2', Pave3', Pave4' from the patches P1, P2, P3, P4 in the four points at that time, the read values Bave2', Bave3' from the standard white plate at that time, and the values of Wave1, Wave2, Pave1, Pave2, Pave3, Pave4, Bave1, Bave2, Bave 3, Bd1 stored in the non-volatile memory.

More specifically, as with the foregoing embodiment, upon power-on, the CPU enters the standard white plate density measurement mode to obtain the read values from the patches P1 to P4 in the four points and the read values from the standard white plate 202.

First, the CPU turns on the illumination lamp 205, moves the mirror 206 to the B position, and calculates the average values Pave1' and Pave3' of the read values from the patches P1, P3 at each 256 pixes in the direction of main scan (steps 801 to 806).

Next, the CPU moves the mirror 206 to the C position, and calculates the average values Pave2' and Pave4' of the read values from the patches P2, P4 at each 256 pixes in the direction of main scan (steps 807 to 810).

Subsequently, the CPU brings the optical system to the A position of the standard white plate 202. It then calculates the average value Bave2' of the read signals from the main-scan addresses 4744 to 4999 corresponding to the patches P1, P2.

The CPU also calculates the average value Bave3' of the read signals from the main-scan addresses 0 to 255 corresponding to the patches P3, P4 (steps 811 to 814).

Thereafter, using the measured values Pave1' and Pave3' from the B position, values Wave11' and Wave13' for the copy sheet CCP of density 0.05 on the original platen 15 are calculated as with the foregoing embodiment.

Wave11' calculated from Pave1' is given by Wave11'=(Pave1'/Pave1)×Wave1, and Wave13' calculated from Pave2' is given by Wave13'=(Pave2'/Pave2)×Wave1.

The patch measured values from the B position at two different points in the direction of main scan are dependent on illumination conditions of the respective patches. Since the extent of stains of the optical mirrors is gently changed between the patches P1 and P3 in many cases, a value Wave1' for the copy sheet CCP of density 0.05 on the original platen 15 at present can be regarded as an average value of Wave11' and Wave13'. Thus, Wave1'=½ (Wave11'+Wave13').

Likewise, a value Bave1' for the central portion of the standard white plate at present is determined as an average value of a value Bave12' calculated from Bave2' and a value Bave13' calculated from Bave3'.

Figure 5:
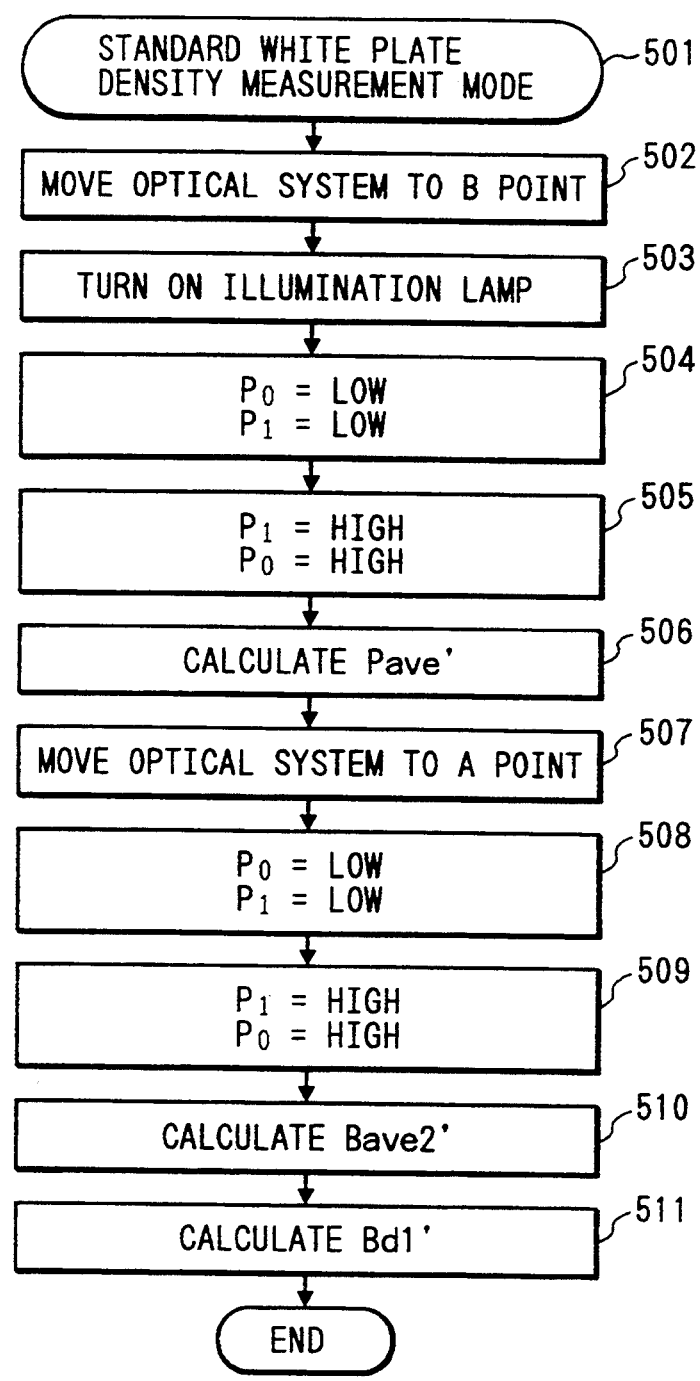
FIG. 5 is a control flowchart for correction of standard white plate density in one embodiment of the present invention.

Similarly to the foregoing embodiment of FIG. 5, Bave12' and Bave13' are calculated from the following Equations (2):

$$\text{Bave12}' = \frac{\text{Bave2}'}{\text{Bave2}} \times \text{Bave1} \qquad (2)$$

$$Bave13' = \frac{Bave3'}{Bave3} \times Bave1$$

As an average value of the above twos, $Bave1' = \frac{1}{2}(Bave12' + Bave13')$ is derived.

In order to achieve the shading correction by using the value Wave1' calculated from Wave1 at the B position and the above calculated value Bave1' so that Wave1' for the white copy sheet of density 0.05 is normalized to 255, the read value from the standard white plate 202 must be converted into Bd1B' given by the following equation (3) through the shading correction:

$$Bd1B' = 255 \times \frac{Bave1'}{Wave1'} \quad (3)$$
$$= 255 \times \frac{Bave1}{Wave1} \times \frac{(Bave2'/Bave2 + Bave3'/Bave3)}{(Pave1'/Pave1 + Pave3'/Pave3)}$$
$$= Bd1 \times \frac{(Bave2'/Bave2 + Bave3'/Bave3)}{(Pave1'/Pave1 + Pave3'/Pave3)}$$

This implies that Bd1 is corrected by using the ratios Pave1'/Pave1, Pave3'/Pave3 of the read values from the patches P1, P3 obtained in the standard white plate density measurement mode to the read values thereof at present and the ratios Bave2'/Bave2, Bave3'/Bave3 of the read values from the standard white plate 202, to thereby obtain the target value Bd1B' for the present shading correction.

After obtaining Bd1B' from the patch measured values at the B position, a target value Bd1C' for the shading correction is similarly calculated from the patch measured values at the C position:

$$Bd1C' = Bd1 \times \frac{(Bave2'/Bave2 + Bave3'/Bave3)}{(Pave2'/Pave2 + Pave4'/Pave4)} \quad (4)$$

The CPU calculates Bd1' (step 511), followed by bringing the standard white plate density correction mode to an end.

The change rate of light intensities read from the patches at the B position and the change rate of light intensities read from the patches at the C position are not constant due to variations in parallelism and mount angles of the mirrors different depending on positions along the sub-scan axis. In this embodiment, therefore, the target values for the shading correction are separately calculated from two points (i.e., the B and C positions) in the direction of sub scan and then averaged.

Thus, using Bd1B' and Bd1C', a correction target value Bd1' for the shading correction of the read data from the standard white plate 202 is given by $Bd1' = \frac{1}{2}(Bd1B' + Bd1C')$.

In the subsequent original read operation, the shading correction is performed by setting Bd=Bd1' as with the foregoing embodiment.

While the above embodiments are explained in connection with a monochromatic reader, still another embodiment applying the present invention to a color reader will be described below.

FIG. 21 is a sectional view of a color reader for use in this embodiment. The color reader is basically identical to the reader of FIG. 2 except for that the photoelectric transducer 210 is replaced by a monolithic CCD 1001 comprising three lines of R, G, B to read a color image. An arrangement of this CCD 1001 is shown in FIG. 22.

CCD sensors 1103, 1104, 1105 are formed on a single chip 1102 parallel to one another with spacings of 180 $\mu$m. The sensor 1103 is covered with a red (R) filter, the sensor 1104 with a green (G) filter, and the sensor 1105 with a blue (B) filter.

The number of pixels porvided in each CCD sensor is about 5000 so that the lengthwise span 297 mm of an A4-size original may be read with resolution of 400 dots/inch. Denoted at 1106 is an enlarged view of part of the sensor. As seen, the width of one pixel is 10 $\mu$m and the distance between the two adjacent sensors is 180 $\mu$m.

Figure 20B:
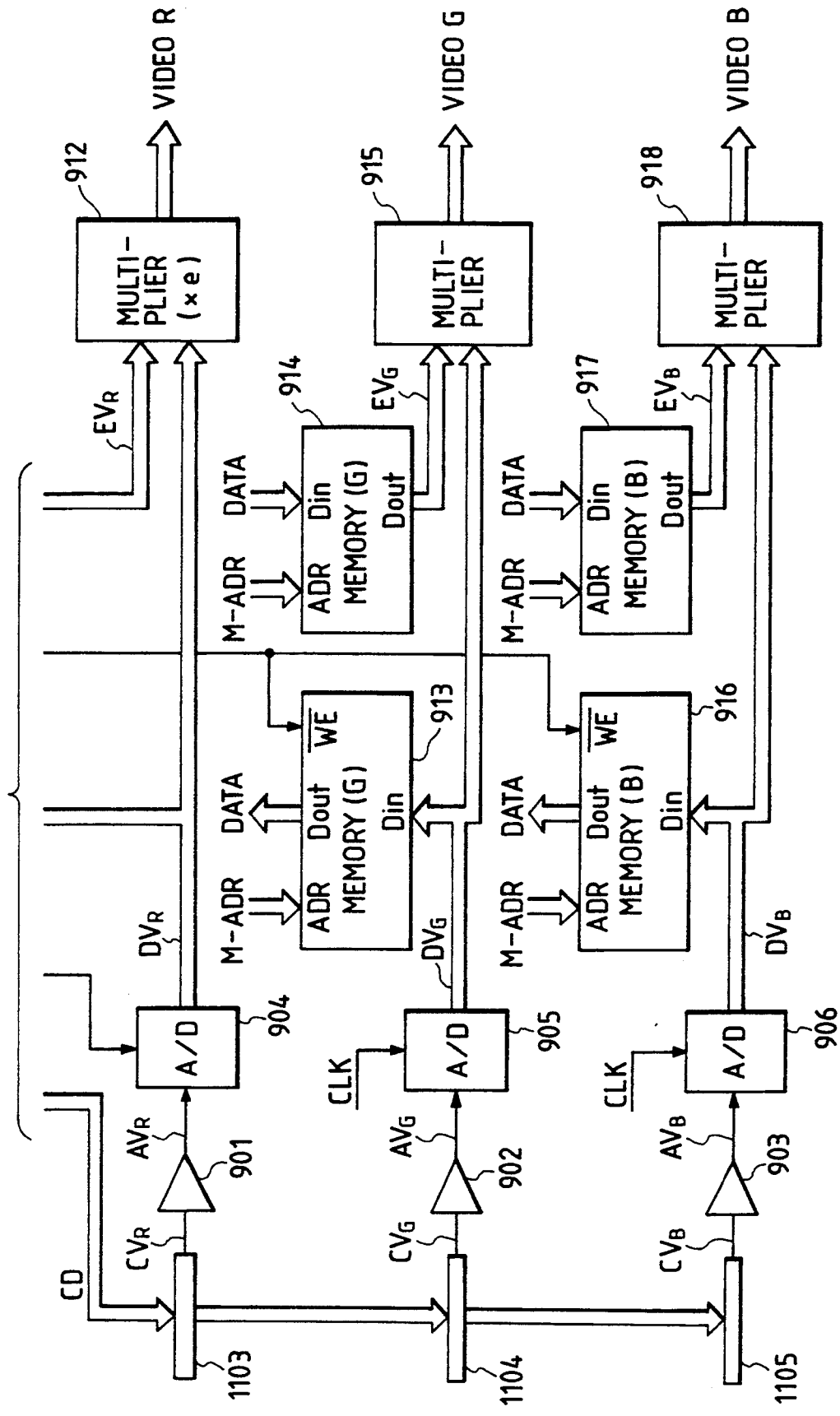

FIGS. 20A and 20B show a signal processing unit in this embodiment. The signal processing unit of FIGS. 20A and 20B are basically identical to that in the embodiment of FIG. 1 except for that corresponding to the CCD comprised of three lines, there are provided three lines of amplifiers, A/D converters, first memories, second memories and multipliers.

Original Read Operation

The original read operation is basically identical to that in the foregoing embodiment, and the shading correction is performed independently for R, G, B color signals.

The target value Bd used for correcting read signals from the standard white plate 202 through the shading correction is also set independently for each of three colors R, G, B and given by BdR, BdG, BdB.

Standard White Plate Measurement Mode

Figure 23:
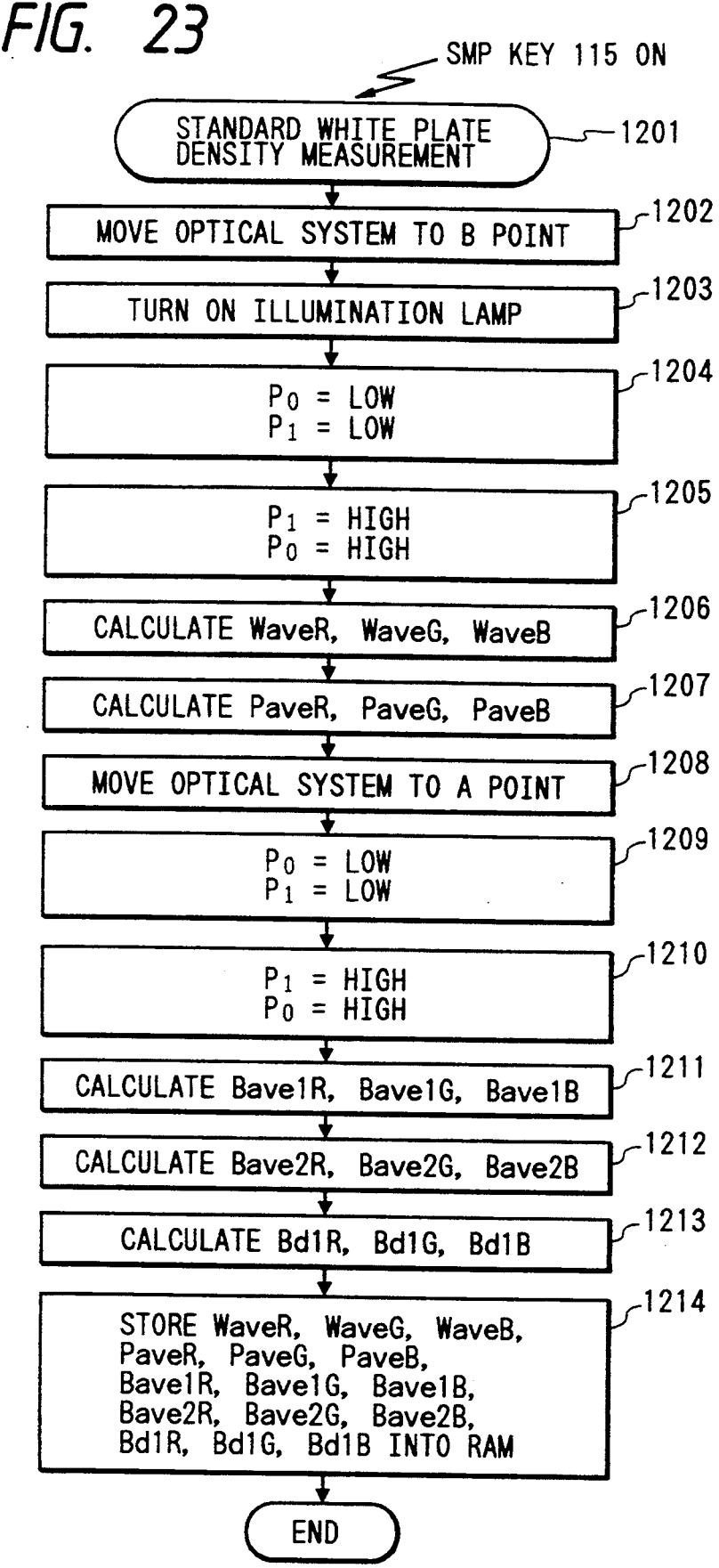
FIG. 23 is a control flowchart for measurement of standard white plate density in another modified embodiment of the present invention.
Figure 24:
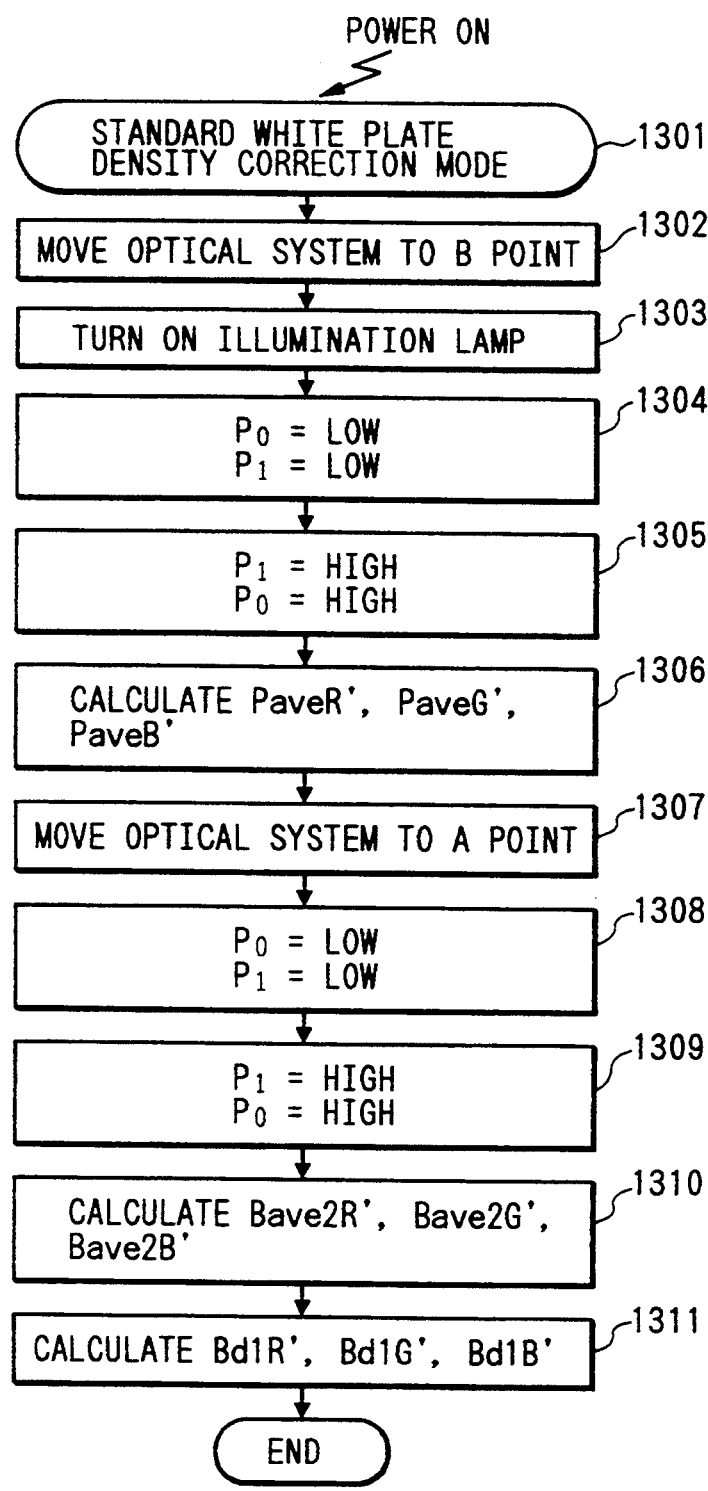
FIG. 24 is a control flowchart for correction of standard white plate density in another modified embodiment of the present invention.

In this mode, too, measurement identical to that in the foregoing embodiment is carried out for each of three colors R, G, B. The measurement procedure is shown in FIG. 23.

Corresponding to the read value Wave from a copy sheet of density 0.05 in the foregoing embodiment, WaveR, WaveG, WaveB are measured and calculated for each of three colors R, G, B (steps 1201 to 1206).

Likewise, corresponding to the read value Pave from the patch 301P, PaveR, PaveG, PaveB are measured and calculated (step 1207).

Likewise, corresponding to the read values Bave1, Bave2 from the standard white plate 202, Bave1R, Bave2R, Bave1G, Bave2G, Bave1B, Bave2B are measured and calculated for each of three colors R, G, B (steps 1208 to 1212).

Because of a copy sheet being white with density of 0.05, the light intensity conversion value in the form of an 8-bit multivalue signal is normalized to a level of 255 for each of R, G, B.

As a result, light intensity conversion values Bd1R, Bd1G, Bd1B for density of the standard white plate in R, G, B colors are expressed by the following equations (5):

$$Bd1R = 255 \times \frac{Bave1R}{WaveR} \quad (5)$$
$$Bd1G = 255 \times \frac{Bave1G}{BaveG}$$
$$Bd1B = 255 \times \frac{Bave1B}{WaveB}$$

The CPU stores the values of WaveR, WaveG, WaveB, PaveR, PaveG, PaveB, Bave1R, Bave1G, Bave1B, Bave2R, Bave2G, Bave2B, BG1R, Bd1G, Bd1B in the non-volatile battery backup RAM 116 (step 1214).

In the original read operation immediately after the standard white plate density measurement mode executed upon the SMP key 115 being depressed, the shading correction is performed by setting BdR=Bd1R, BdG=Bd1G, BdB=Bd1B.

Standard White Plate Density Correction Mode

This mode is executed in the same manner as that in the foregoing embodiment for each of three colors R, G, B.

Corresponding to the read data Pave' from the patch 301P in the foregoing embodiment of FIG. 2, PaveR', PaveG', PaveB' are measured and calculated (steps 1301 to 1306).

Then, corresponding to Bave2', Bave2R', Pave2G, Paave2B' are measured and calculated (steps 1307 to 1110).

Calculated values from a copy sheet of density 0.05 on the platen 203 under the illumination condition at the time of executing this mode are obtained by the following equations (6) for each of R, G, B:

$$WaveR' = \frac{PaveR'}{PaveR} \times WaveR \quad (6)$$

$$WaveG' = \frac{PaveG'}{PaveG} \times WaveG$$

$$WaveB' = \frac{PaveB'}{PaveB} \times WaveB$$

Similarly, values from the standard white plate 202 are calculated by the following equations (7) for each of R, G, B:

$$Bave1R' = \frac{Bave2R'}{Bave2R} \times Bave1R \quad (7)$$

$$Bave1G' = \frac{Bave2G'}{Bave2G} \times Bave1G$$

$$Bave1B' = \frac{Bave2B'}{Bave2B} \times Bave1B$$

Further, under the conditions of the standard white plate 202 and illumination at the time of executing this mode, the values WaveR', WaveG', WaveB' from the white copy sheet on the platen are also normalized to a level of 255. Therefore, the target values used for correcting the read signals from the standard white plate 202 through the shading correction are given by the following equations (8) for R, G, B (step 1311):

$$Bd1R' = 255 \times \frac{Bave1R'}{WaveR'} \quad (8)$$

$$Bd1G' = 255 \times \frac{Bave1G'}{WaveG'}$$

$$Bd1B' = 255 \times \frac{Bave1B'}{WaveB'}$$

Putting the above Bave1R', Bave1G', Bave1B' and WaveR', WaveG', WaveB' into the equations (8) results in the following equations:

$$Bd1R' = Bd1R \times \frac{Bave2R'/PaveR'}{Bave2R/PaveR} \quad (9)$$

$$Bd1G' = Bd1G \times \frac{Bave2G'/PaveG'}{Bave2G/PaveG}$$

$$Bd1B' = Bd1B \times \frac{Bave2B'/PaveB'}{Bave2B/PaveB}$$

In the original read operation after the execution of this mode, the shading correction is performed by setting BdR=Bd1R', BdG=Bd1G', BdB=Bd1B' as with the above embodiment.

As a result, when the copy sheet of density 0.05 on the original platen 15 is read through the shading correction, VIDEO signals from the respective pixels of the CCD for each of R, G, B are each outputted as a value normalized to 255.

Additionally, the standard white plate correction mode may be executed similarly for each of R, G, B by providing a plurality of patches as shown in FIG. 17.

In the above embodiments, the density reference is given by a copy sheet of density 0.05 placed on the original platen 15 immediately after unsealing a pack of copy paper. Where the patch density is under strict control, however, the read signals from the patch may be used as the density reference for the reader.

In this case, Bave2 and Pave are employed instead of Bave1 and Wave measured from the main-scan addresses 2500 to 2755 in the standard white plate density measurement mode. Stated otherwise, with the patch density being 0.05, this corresponds to 255 in a light intensity conversion value of 8 bits, hence:

$$Bd1 = 255 \times Bave2 / Pave$$

Also, when the patch density is 240 in a light intensity conversion value, there holds:

$$Bd1 = 240 \times Bave2 / Pave$$

In the standard white plate density measurement mode, the target value Bd1' for the shading correction applied to the read signals from the standard white plate is given by the following equation (10):

$$Bd1' = Bd1 \times (Bave2'/Pave')/(Bave2/Pave) \quad (10)$$
$$= 255 \times (Bave2'/Pave')$$

Herein, the standard white plate density correction mode and the standard white plate density measurement mode execute the same processing.

Thus, in this modified embodiment, the target value Bd1 for the shading correction is determined by using only the ratio of the signal value read from the standard white plate to the signal value read from the patch.

As explained above, by providing a reference patch of predetermined density outside the original read area, and measuring brightness of a standard white plate from a read signal from the patch and changes in a read signal from the standard white plate, an original of predetermined density on the original platen is always automatically calibrated to a signal value corresponding to that density regardless of variations caused by stains or the like in the standard white plate and/or optical system. Consequently, the interval of cleaning the optical system by an operator is prolonged and operability and stability of the reader is improved.

In short, as described hereinabove, since unevenness of a video signal obtained by reading an image of an original on a platen is corrected on the basis of the first standard signal obtained by reading a first standard member having even density, and correction operation for such unevenness of the video signal is compensated on the basis of a second standard signal obtained by reading a second standard member having even density and provided at a position different from the first standard member, it is possible to always correct the unevenness of the video signal with satisfactory results, without being affected by changes over time, stains, etc..

It should be appreciated that the present invention is not limited to the above-mentioned embodiments and can be modified and varied within a scope defined in the attached claims.

What is claimed is:

1. An image reader comprising:
   a platen on which an original is to be placed;
   reading means for reading an image of the orignal placed on said platen and for generating an image signal;
   a first standard member for use in a measurement of unevenness of an output of said reading means;
   a second standard member having a predetermined standard density;
   correction means for correcting the unevenness of the image signal obtained by reading the image of the original with said reading means, on the basis of a first standard signal obtained by reading said first standard member and a reference density signal obtained by reading a reference original having a predetermined reference density placed on said platen with said reading means; and
   compensation means for compensating the correction operation made by said correction means on the basis of a second standard signal obtained by reading said second standard member with said reading means.

2. An image reader according to claim 1, wherein said second standard member is provided at a position under such environments that a density change rate of said second standard member is lower than a density change rate of said first standard member.

3. An image reader according to claim 2, wherein said second standard member is provided on said platen.

4. An image reader according to claim 2, wherein said first standard member is provided inside a housing of said reader.

5. An image reader according to claim 1, further comprising feed means for feeding originals onto said platen.

6. An image reader according to claim 1, wherein said correction means determines a target value on the basis of the first standard signal and the reference density signal and corrects the unevenness of the image signal utilizing the target value.

7. An image reader according to claim 6, wherein said compensation means compensates the target value for use in the correction of the unevenness of the image signal on the basis of the second standard signal.

8. An image reader according to claim 6, wherein said correction means comprises a non-volatile memory for storing the target value determined on the basis of the first standard signal and the reference density signal.

9. An image reader comprising:
   a platen on which an original is to be placed;
   reading means for reading an image of the original placed on said platen and for generating an image signal;
   a first standard member for use in a measurement of unevenness of the output of said reading means;
   a second standard member having a predetermined standard density; and
   correction means for correcting the unevenness of the image signal obtained by reading the image of the original with said reading means;
   wherein, in a first mode, said correction means performs the correction operation on the basis of a first standard signal obtained by reading said first standard member and a reference density signal obtained by reading a reference original having a predetermined reference density placed on said platen with said reading means, and
   in a second mode, said correction means performs the correction operation on the basis of the first standard signal obtained by reading said first standard member and, instead of the reference density signal, a second standard signal obtained by reading said second standard member with said reading means.

10. An image reader according to claim 9, wherein said second standard member is provided at a position under such environments that a density change rate of said second standard member is lower than a density change rate of said first standard member.

11. An image reader according to claim 10, wherein said second standard member is provided on said platen.

12. An image reader according to claim 10, wherein said first standard member is provided inside a housing of said reader.

13. An image reader according to claim 9, further comprising feed means for feeding originals onto said platen.

14. An image reader according to claim 9, wherein, in said first mode, said correction means determines a target value on the basis of the first standard signal and the reference density signal and corrects the unevenness of the image signal utilizing the determined target value.

15. An image reader according to claim 14, wherein, in said second mode, said correction means compensates the target value on the basis of the first standard signal and the second standard signal and corrects the unevenness of the image signal utilizing the compensated target value.

* * * * *

UNITED STATES PATENT AND TRADEMARK OFFICE
CERTIFICATE OF CORRECTION

PATENT NO. : 5,371,613
DATED : December 6, 1994
INVENTOR(S) : Shinobu Arimoto, et al.           PAGE 1 OF 2

It is certified that error appears in the above-identified patent and that said Letters Patent is hereby corrected as shown below:

COLUMN 6

Line 37, "locates" should read --located--; and
Line 38, "place," should read --placed,--.

COLUMN 10

Line 18, "con, hand" should read --command--.

COLUMN 11

Line 19, "noted" should read --not--; and
Line 44, "note" should read --not--.

COLUMN 15

Line 24, "ky" should read --by--;
Line 28, "informed" should read --determined--.

COLUMN 19

Line 41, "tile" should read --the--.

UNITED STATES PATENT AND TRADEMARK OFFICE
CERTIFICATE OF CORRECTION

PATENT NO. : 5,371,613
DATED : December 6, 1994
INVENTOR(S) : Shinobu Arimoto, et al.

PAGE 2 OF 2

It is certified that error appears in the above-identified patent and that said Letters Patent is hereby corrected as shown below:

<u>COLUMN 20</u>

Line 9, "297 mm" should read --(297 mm)--.

<u>COLUMN 21</u>

Line 1, "BG1R" should read --Bd1R--; and
    Line 19, "Paave2B'" should read --Pave2B'--.

Signed and Sealed this

Thirtieth Day of May, 1995

*Attest:*

BRUCE LEHMAN

*Attesting Officer*     *Commissioner of Patents and Trademarks*